US012000183B2

(12) United States Patent
Sato et al.

(10) Patent No.: US 12,000,183 B2
(45) Date of Patent: Jun. 4, 2024

(54) DOOR HANDLE APPARATUS AND CONTROLLER

(71) Applicant: ALPS ALPINE CO., LTD., Tokyo (JP)

(72) Inventors: Wataru Sato, Miyagi (JP); Yuzuru Kawana, Miyagi (JP); Hajime Shikata, Miyagi (JP); Kazuhito Oshita, Miyagi (JP); Takeshi Masaki, Tokyo (JP); Takashi Sasaki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 290 days.

(21) Appl. No.: 17/649,978

(22) Filed: Feb. 4, 2022

(65) Prior Publication Data

US 2022/0154498 A1   May 19, 2022

Related U.S. Application Data

(63) Continuation of application No. PCT/JP2020/008095, filed on Feb. 27, 2020.

(30) Foreign Application Priority Data

Sep. 4, 2019 (JP) .................................. 2019-161483

(51) Int. Cl.
*E05B 81/76* (2014.01)
*E05B 81/56* (2014.01)
*E05B 85/10* (2014.01)

(52) U.S. Cl.
CPC .............. *E05B 81/77* (2013.01); *E05B 81/56* (2013.01); *E05B 85/10* (2013.01)

(58) Field of Classification Search
CPC .......... E05B 81/56; E05B 81/76; E05B 81/77; E05B 85/10; E05B 85/14; E05B 85/16; E05B 85/18
See application file for complete search history.

(56) References Cited

U.S. PATENT DOCUMENTS

| 2016/0277023 A1* | 9/2016 | Nakajima | H03K 17/9625 |
| 2017/0260778 A1* | 9/2017 | Witte | G07C 9/00174 |
| 2019/0048645 A1* | 2/2019 | Nakatomi | E05B 81/76 |

FOREIGN PATENT DOCUMENTS

| DE | 102005061755 A1 * | 6/2007 | B60R 25/246 |
| JP | 2016-130392 | 7/2016 | |
| JP | 2018-053667 | 4/2018 | |
| JP | 2019-031858 | 2/2019 | |
| WO | WO-2015180943 A1 * | 12/2015 | E05B 81/76 |

OTHER PUBLICATIONS

Translation of DE 102005061755 A1 (Year: 2005).*
International Search Report for PCT/JP2020/008095 mailed on Jun. 2, 2020.

* cited by examiner

*Primary Examiner* — Christine M Mills
*Assistant Examiner* — Christopher F Callahan
(74) *Attorney, Agent, or Firm* — IPUSA, PLLC

(57) ABSTRACT

A door handle, to be attached to a door, includes an outer case, an inner case integrated with the outer case, and a pressure detector configured to detect pressure applied to the inner case. The inner case includes a recess in proximity to an end portion in a longitudinal direction, and the pressure detector detects a displacement of a first inner wall surface on a center portion side of the inner case in the recess, caused by the pressure applied to the inner case.

12 Claims, 16 Drawing Sheets

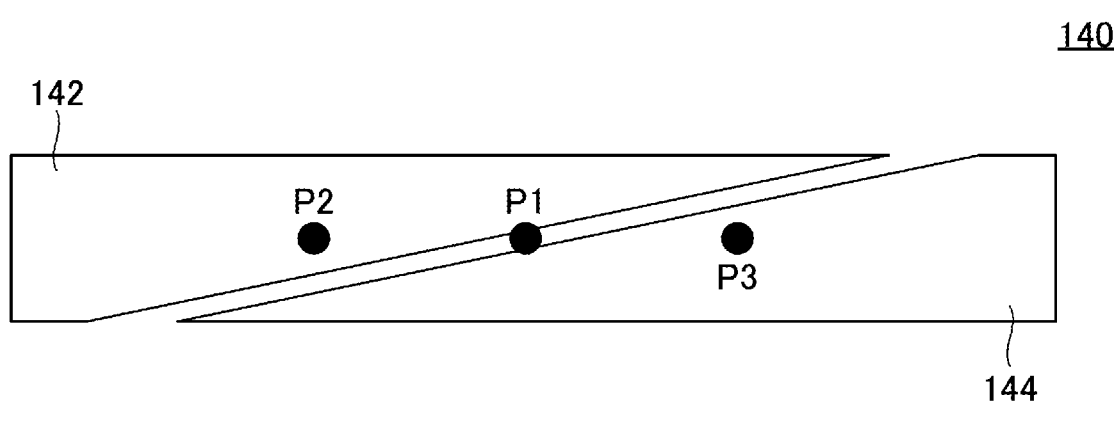
FIG.10
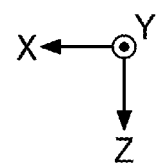

DOOR HANDLE APPARATUS AND CONTROLLER

CROSS-REFERENCE TO RELATED APPLICATIONS

This application is a continuation of International Application No. PCT/JP2020/008095, filed on Feb. 27, 2020 and designating the U.S., which claims priority to Japanese Patent Application No. 2019-161483 filed on Sep. 4, 2019. The contents of these applications are incorporated herein by reference in their entirety.

BACKGROUND OF THE INVENTION

1. Field of the Invention

The present invention relates to a door handle and a controller.

2. Description of the Related Art

For example, Patent Document 1 discloses a technique for unlocking or locking a door of a vehicle by detecting deformation of a substrate in a door handle with a pressure sensor provided on the substrate in the door handle for a vehicle when the pressure is applied to the door handle.

However, in the technology described in Patent Document 1, because the deformation of the substrate provided in the center portion of the longitudinal direction of the door handle is detected, the deformation amount is relatively small, and it is difficult to more reliably detect the pressure applied to the door handle.

RELATED-ART DOCUMENTS

Patent Documents
   Patent Document 1: Japanese Laid-Open Patent Publication No. 2016-130392

SUMMARY OF THE INVENTION

According to an embodiment, a door handle, to be attached to a door, includes an outer case, an inner case integrated with the outer case, and a pressure detector configured to detect pressure applied to the inner case. The inner case includes a recess in proximity to an end portion in a longitudinal direction, and the pressure detector detects a displacement of a first inner wall surface on a center portion side of the inner case in the recess, caused by the pressure applied to the inner case.

According to an embodiment, pressure applied to the inside of the door handle can be more reliably detected.

BRIEF DESCRIPTION OF THE DRAWINGS

FIG. 10 is a plan view illustrating a configuration example of an electrostatic sensor included in the door handle according to the embodiment;

DESCRIPTION OF THE EMBODIMENTS

Figure 1:
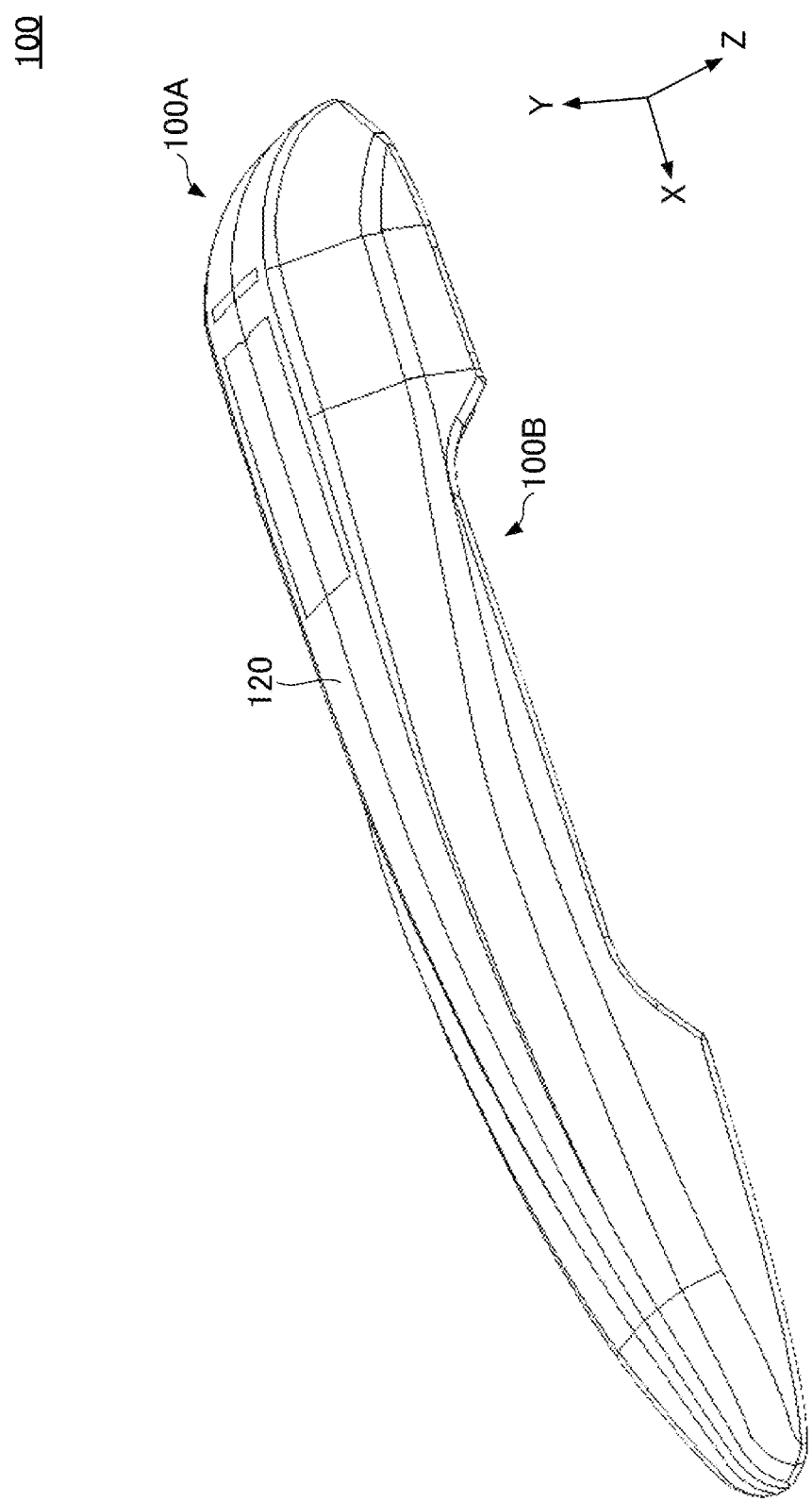
FIG. 1 is an external perspective view of a door handle according to an embodiment as viewed from an outside of a vehicle.

In the following, embodiments will be described with reference to the accompanying drawings. In the drawings, for the sake of convenience, a Z-axis direction (corresponding to the height direction of a vehicle) is referred to as a vertical direction, a Y-axis direction (corresponding to the width direction of the vehicle) is referred to as a lateral direction, and an X-axis direction (corresponding to the lengthwise direction of the vehicle) is referred to as a longitudinal direction. Further, a positive Y-axis side is referred to as an outside and an outer side of the vehicle, and a negative Y-axis side is referred to as an inside and an inner side of the vehicle.

<Overview of Door Handle 100>

Figure 2:
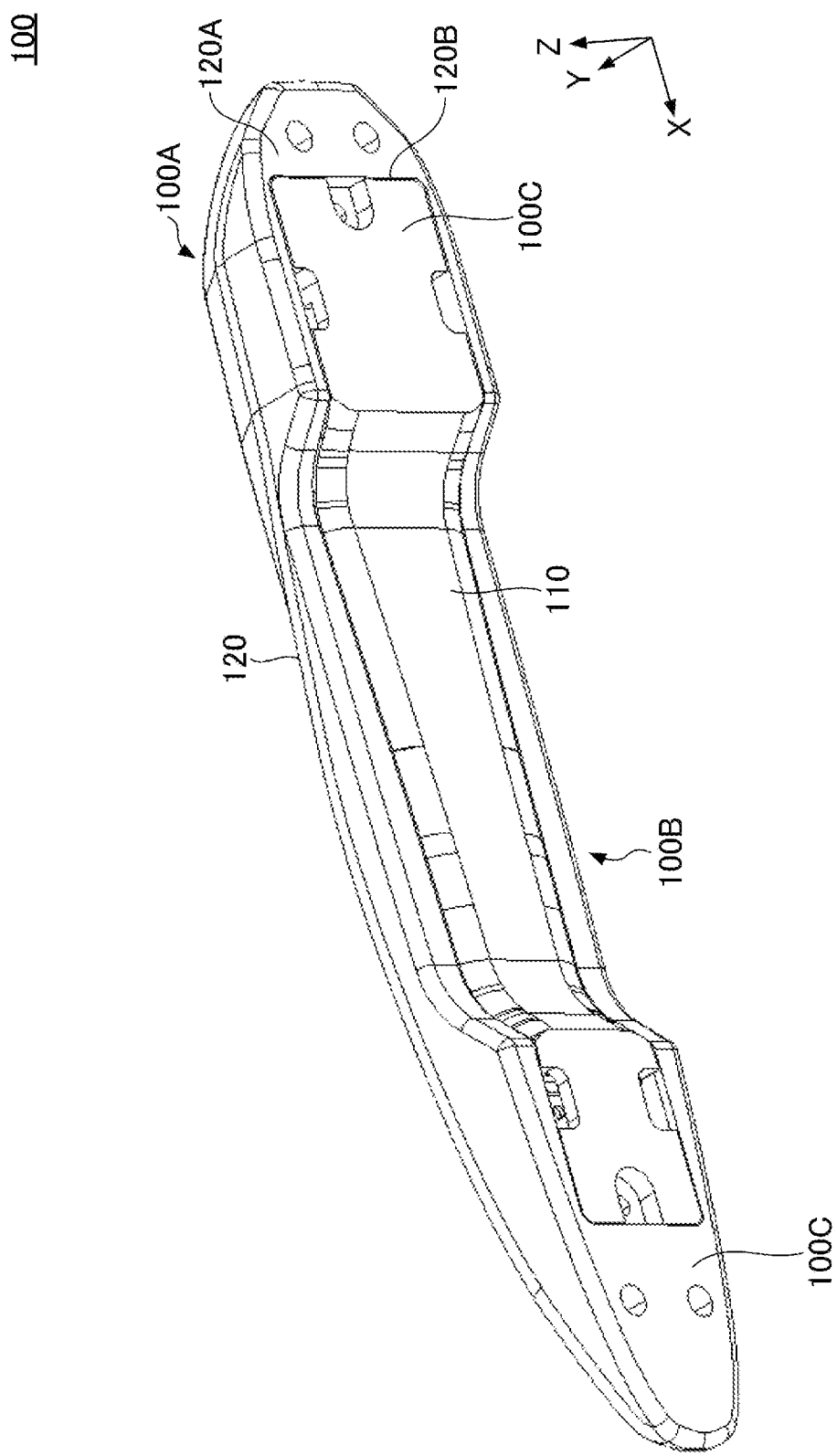
FIG. 2 is an external perspective view of the door handle according to the embodiment as viewed from an inside of the vehicle.

FIG. 1 is an external perspective view of a door handle 100 according to an embodiment as viewed from an outside of a vehicle. FIG. 2 is an external perspective view of the door handle 100 according to the embodiment as viewed from an inside of the vehicle. The door handle 100 illustrated in FIG. 1 and FIG. 2 is an elongated rod shape component extending along the longitudinal direction (the X-axis direction) of the vehicle. The door handle 100 is a component that is held by the user when the user opens and closes the door 20 by being attached to a vehicle outer surface 20A (see FIG. 3) of the door 20 of the vehicle.

As illustrated in FIG. 1 and FIG. 2, the door handle 100 includes a case 100A. The case 100A forms the external shape of the door handle 100. The case 100A may be formed from a resinous material such as an Acrylonitrile Butadiene Styrene (ABS) resin or a polycarbonate (PC) resin. The case 100A has an inner case 110 that is on the inner side of the vehicle (the negative Y-axis side) and an outer case 120 that is mainly on the outer side of the vehicle (the positive Y-axis side). Both the inner case 110 and the outer case 120 have a longitudinal shape in the longitudinal direction (the X-axis direction). The inner case 110 and the outer case 120 are combined with each other.

As illustrated in FIG. 2, an opening 120B extending in the longitudinal direction (the X-axis direction) is formed on the side surface 120A of the outer case 120 provided on the inner side of the vehicle (the negative Y-axis side). The opening 120B has approximately the same shape as the outer shape of the inner case 110. The inner case 110 is fitted into the opening 120B.

A recess 100B that is concavely recessed toward the outside of the vehicle (the positive Y-axis side) is formed at the center portion in the longitudinal direction (the X-axis side) and the inner side of the vehicle (the negative Y-axis side) of the door handle 100. Further, a pair of flat installation surfaces 100C is provided at both end portions in the longitudinal direction (the positive X-axis side) and the inner side of the vehicle (the negative Y-axis side) of the door handle 100.

Figure 3:
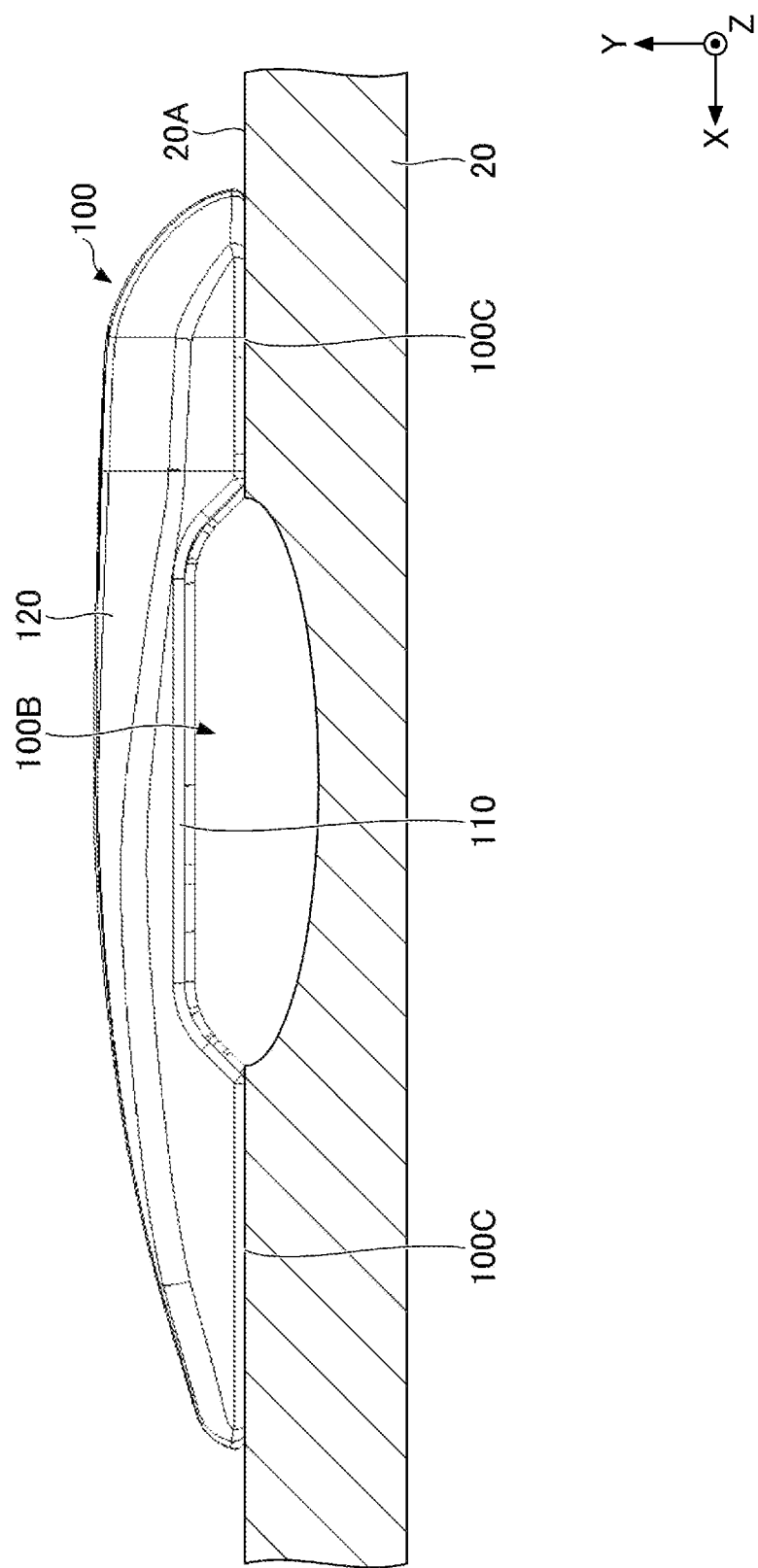
FIG. 3 is a diagram illustrating mounting status of the door handle according to the embodiment.

FIG. 3 is a diagram illustrating a mounting status of the door handle 100 according to the embodiment. As illustrated in FIG. 3, the door handle 100 is screwed and fixed relative to the door 20 with each of the pair of installation surfaces 100C in contact with the vehicle outer surface 20A of the door 20.

As illustrated in FIG. 3, the door handle 100 has the recess 100B to form a space (see FIG. 3) in which the user's hand can be inserted between the vehicle outer surface 20A of the door 20 and the door handle 100. Therefore, the door handle 100 can be held by the user's hand.

<Configuration of Door Handle 100>

Figure 4:
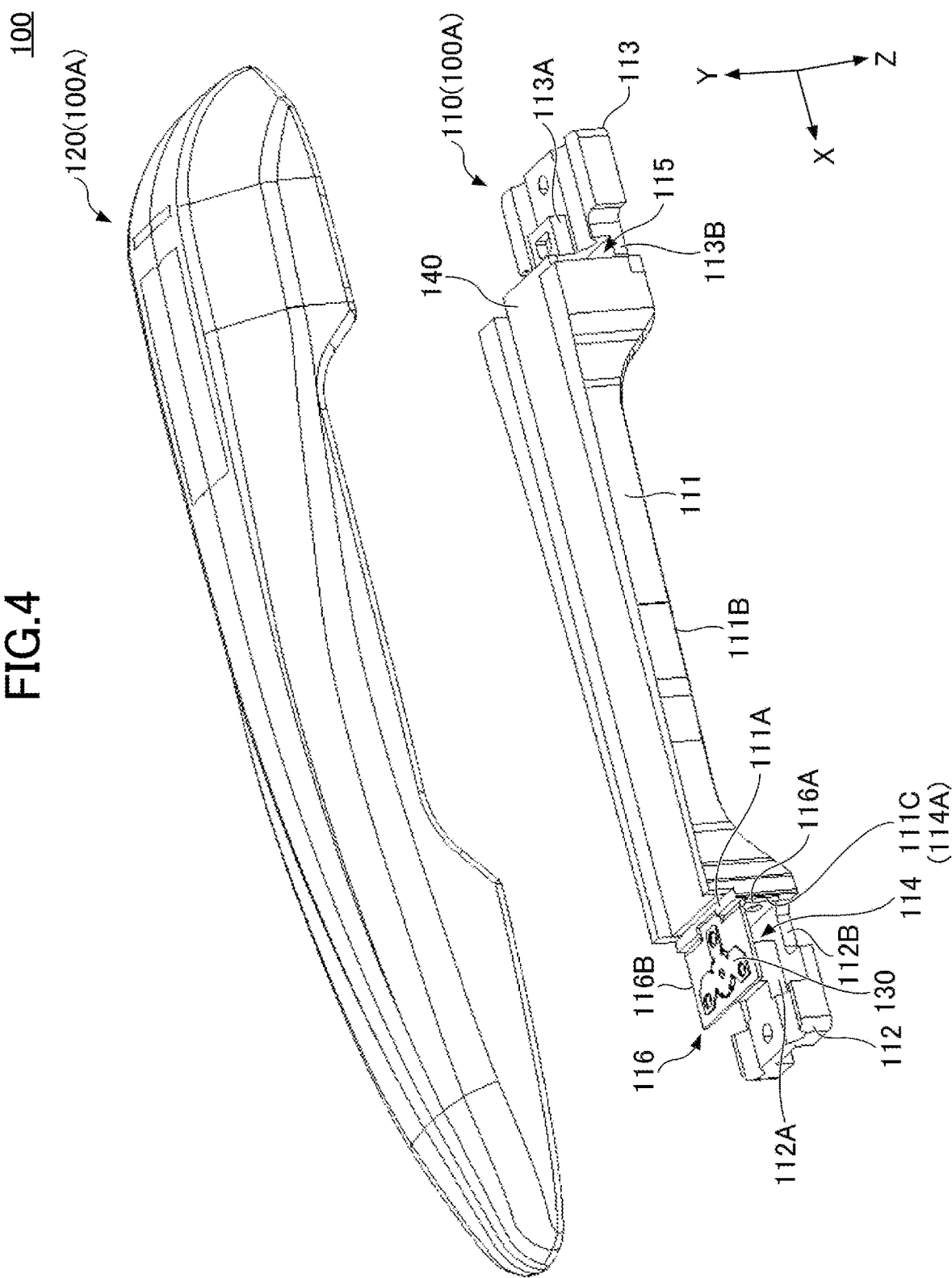
FIG. 4 is a disassembled perspective view of the door handle according to the embodiment.
Figure 5:
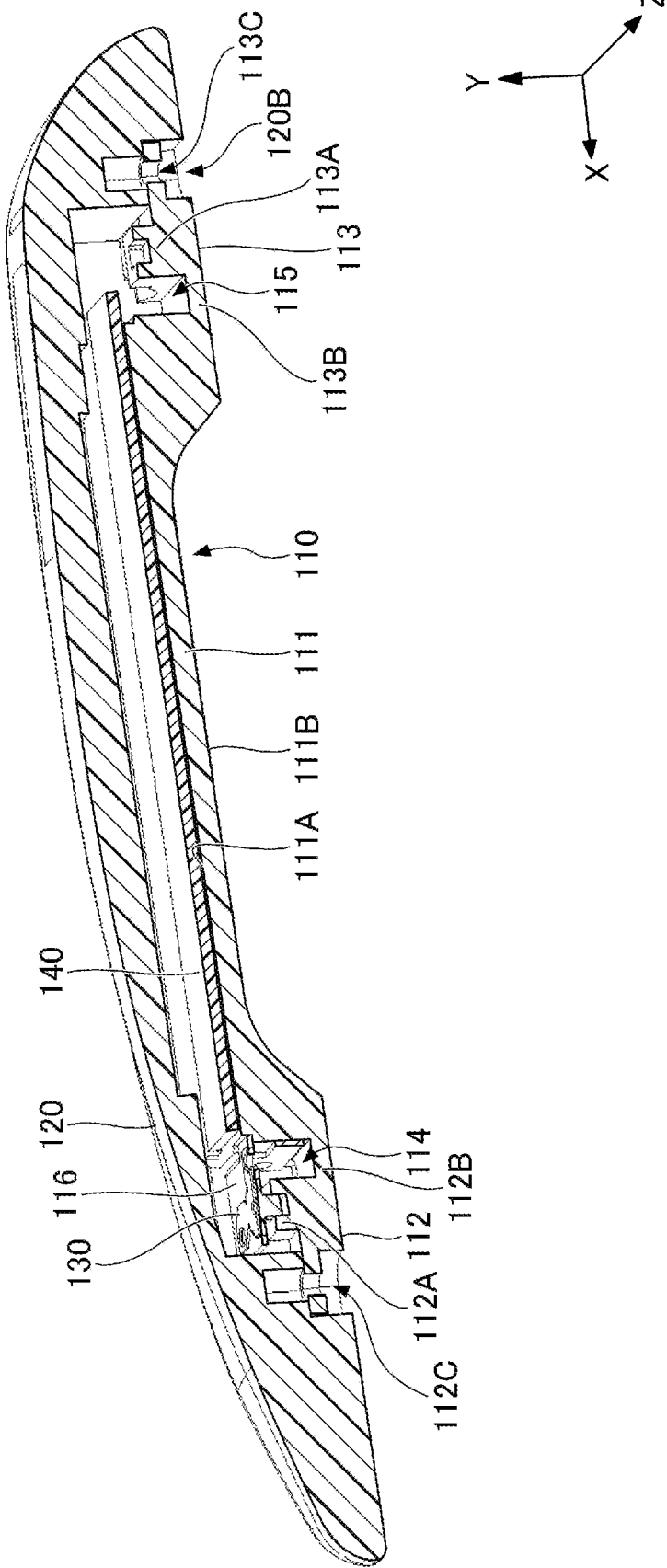
FIG. 5 is a cross-sectional view of the door handle according to the embodiment.

FIG. 4 is a disassembled perspective view of the door handle 100 according to the embodiment. FIG. 5 is a cross-sectional view of the door handle 100 according to the embodiment and is a cross-section view of the XY plane viewed from an approximately oblique angle in the positive X-axis direction and in the positive Y-axis direction.

As illustrated in FIG. 4, the case 100A of the door handle 100 can be divided into the inner case 110 and the outer case 120. The inner case 110 is integrated with the outer case 120 by being fit into the opening 120B having approximately the same shape as the inner case 110 formed in the outer case 120. The inner case 110 includes a holding section 111, a fixing section 112, and a fixing section 113.

The holding section 111 is provided at the center of the inner case 110 in the longitudinal direction (the X-axis direction) and is an elongated-shaped portion extending in the longitudinal direction (the X-axis direction). The holding section 111 is a portion where pressure is applied to the vehicle outer direction (the positive Y-axis direction) by the user's hand when trying to open the door 20. A side surface 111A of the outer side of the vehicle (the positive Y-axis side) of the holding section 111 is planar. An electrostatic sensor 140 is provided at the side surface 111A. The electrostatic sensor 140 is an example of a "contact detector". The electrostatic sensor 140 is a thin, flat, rectangular shape and is elongated in the X-axis direction as viewed from the outside of the vehicle in planar view. The electrostatic sensor 140 includes a detection electrode and when the user's hand comes into contact with the inside of the door handle 100, a current value corresponding to the capacitance of the detection electrode is output as a contact sensing signal. An inner side 111B of the holding section 111 is curved and extends along the recess 100B (see FIG. 1 to FIG. 3) of the door handle 100 and forms a part of the recess 100B. Since the thickness in the left-right direction (the Y-axis direction) of the holding section 111 becomes smaller from the end portion toward the center portion in the longitudinal direction (the X-axis direction), the end portion has increased rigidity and is less likely to be deformed.

The fixing section 112 is provided at a front end portion (the front end of the vehicle) of the inner case 110 in the longitudinal direction (the X-axis direction) and is a portion fixed to the outer case 120. The fixing section 112 is a substantially flat plate-shaped portion extending forward (the positive X-axis direction) from the front end portion of the holding section 111. A pedestal portion 112A is provided on the surface of the fixing section 112 on the outer side of the vehicle (the positive Y-axis side), apart from the front end portion of the holding section 111. As a result, a recess 114 is formed in the fixing section 112 that is partially recessed on the inner side of the vehicle (the negative Y-axis side) between the holding section 111 and the pedestal portion 112A. Further, the bottom surface of the recess 114 in the fixing section 112 is formed by a thin portion 112B that is thinner than the surrounding portion (the holding section 111 and the pedestal portion 112A). As a result, the inner case 110 readily elastically deforms locally in the thin portion 112B when pressure is applied in the holding section 111. A screw-fixing portion 112C is formed in a portion of the fixing section 112 on the front side of the pedestal portion 112A, and the fixing section 112 is screwed and fixed to the outer case 120 in the screw-fixing portion 112C.

The fixing section 113 is provided at a rear end portion (the rear end of the vehicle) of the inner case 110 in the longitudinal direction (the X-axis direction) and is a portion fixed to the outer case 120. The fixing section 113 has a symmetrical shape with the fixing section 112 with respect to the YZ plane. The fixing section 113 is a substantially flat plate-shaped portion extending backward (the positive X-axis direction) from the rear end portion of the holding section 111. A pedestal portion 113A is provided on the surface of the fixing section 113 on the outer side of the vehicle (the positive Y-axis side), apart from the rear end portion of the holding section 111.

As a result, a recess 115 is formed in the fixing section 113 that is partially recessed on the inner side of the vehicle (the negative Y-axis side) between the holding section 111 and the pedestal portion 113A. Further, the bottom surface of the recess 115 in the fixing section 113 is formed by a thin portion 113B that is thinner than the surrounding portion (the holding section 111 and the pedestal portion 113A). As a result, the inner case 110 readily elastically deforms locally in the thin portion 113B when pressure is applied in the holding section 111. A screw-fixing portion 113C is formed in a portion of the fixing section 113 on the rear side of the pedestal portion 113A, and the fixing section 113 is screwed and fixed to the outer case 120 in the screw-fixing portion 113C.

<Detailed Configuration around Front End Portion of Inner Case 110>

Figure 6:
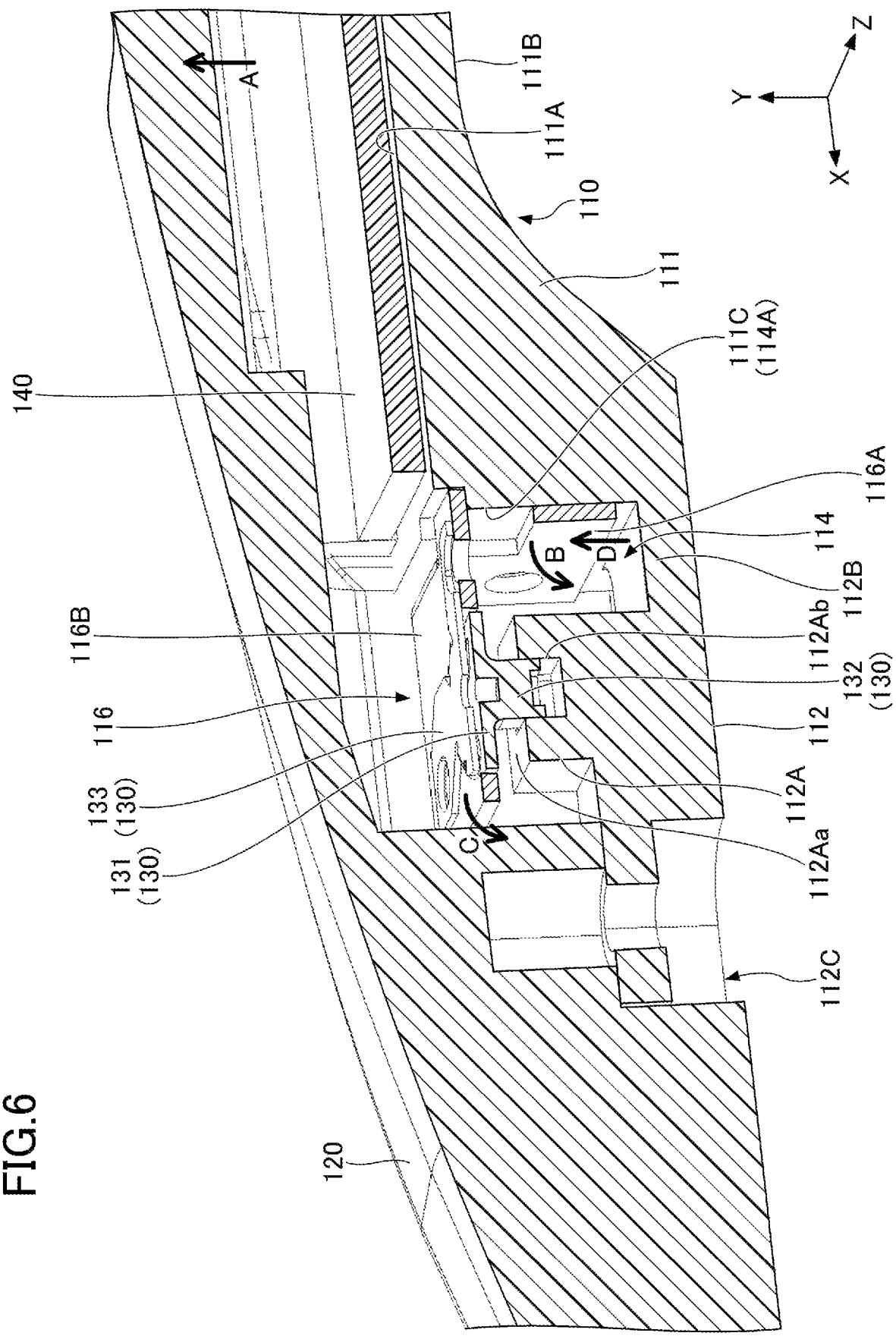
FIG. 6 is a partially enlarged view around the front end portion of the door handle illustrated in FIG. 5.

A detailed configuration of the around the front end portion of the inner case 110 will be described with reference to FIG. 6. FIG. 6 is a partially enlarged view around the front end portion of the door handle 100 illustrated in FIG. 5.

As illustrated in FIG. 6, around the front end portion of the inner case 110, the recess 114 is formed between the holding section 111 and the pedestal portion 112A as described above. Further, the bottom surface of the recess 114 is formed by the thin portion 112B that is thinner than the surrounding portion (the holding section 111 and the pedestal portion 112A). A fixing member 116 made of a metal plate bent at a right angle in an L-shape is fixed to a first inner wall surface 114A on the holding section 111 side in the recess 114 (i.e., the front end surface 111C of the holding section 111). The fixing member 116 includes a first flat plate portion 116A and a second flat plate portion 116B.

The first flat plate portion 116A is a flat plate portion parallel to the front end surface 111C and is fixed to the front end surface 111C.

The second flat plate portion 116B is a flat plate portion perpendicular to the first flat plate portion 116A and the front end surface 111C and extends forward (the positive X-axis direction) from the end portion on the outer side of the vehicle of the first flat plate portion 116A (the positive Y-axis direction).

A pressure detector 130 (an example of a "pressure detector") is attached to the second flat plate portion 116B such that a base portion 131 is perpendicular to the front end surface 111C and a pillar portion 132 that protrudes from the base portion 131 toward the inner side of the vehicle (the negative Y-axis side) faces a surface 112Aa on the outer side of the vehicle of the pedestal portion 112A.

A holding portion 112Ab recessed toward the inner side of the vehicle (the negative Y-axis side) is formed at a position facing the pillar portion 132 in the surface 112Aa of the pedestal portion 112A. The holding portion 112Ab has a rectangular shape in planar view from the outside of the vehicle (the positive Y-axis side). As illustrated in FIG. 6, a tip of the pillar portion 132 is fitted into the holding portion 112Ab. As a result, the tip of the pillar portion 132 is held by the holding portion 112Ab.

<Detection Function of Door Handle 100>

The door handle 100 may detect contact of the user's hand by the electrostatic sensor 140. Specifically, when the capacitance value at the electrostatic sensor 140 is changed by the user's hand contacting the door handle 100, the electrostatic sensor 140 may output a current value representing the change in the capacitance value as a contact detection signal indicating that the user's hand is in contact with the door handle 100.

The door handle 100 may also detect the pressure applied to the inner case 110 by a user's hand with the pressure detector 130.

Specifically, a case in which pressure by the user's hand is applied to the holding section 111 of the inner case 110 in the vehicle outer direction (the positive Y-axis direction) will be described (arrow A illustrated in FIG. 6). In this case, the center portion of the holding section 111 moves in the direction of arrow A, but the pedestal portion 112A is not deformed because the pedestal portion 112A is rigid and is fixed to the outer case 120. Deformation occurs between the pedestal portion 112A and the center. Specifically, the center portion of the holding section 111 is reduced in thickness so that mainly the center portion is deformed to move in the direction of arrow A. Since the thin portion 112B is thin and locally elastically deformed, the positive Y-axis side of the first inner wall surface 114A of the recess 114 (i.e., the front end surface 111C of the holding section 111) is tilted so as to be displaced forward (the positive X-axis direction) (arrow B illustrated in FIG. 6). Further, at the same time, since the thin portion 112B is thin, the portion on the holding section 111 side is slightly displaced in the positive Y-axis direction (arrow D illustrated in FIG. 6).

In other words, when pressure is applied to the vehicle outer direction (the positive Y-axis direction), if the whole of the holding section 111 is sufficiently rigid, the thin portion 112B is deformed, and the entire holding section is displaced in the positive Y-axis direction. Further, if the thin portion 112B constituting the bottom surface of the recess 114 is formed to be thick and has sufficient rigidity, only the center portion of the holding section 111 is deformed. According to the present embodiment, the center portion of the holding section 111 is elastically deformed, also, the end portion of the holding section 111 is rigid and the thin portion 112B formed by being connected to the negative Y-axis side of the first inner wall surface 114A is elastically deformed. Accordingly, the first inner wall surface 114A is tilted such that the positive Y-axis side is displaced forward (the positive X-axis direction).

As the first inner wall surface 114A tilts, the base portion 131 of the pressure detector 130 tilts forward (the positive X-axis direction), together with the fixing member 116 fixed to the first inner wall surface 114A (arrow C illustrated in FIG. 6).

As illustrated in FIG. 6, the tip of the pillar portion 132 of the pressure detector 130 is supported by the pedestal portion 112A. Therefore, the tilt of the base portion 131 causes the inclination of the pillar portion 132 with respect to the base portion 131, resulting in the distortion of the base portion 131.

The pressure detector 130 detects the distortion of the base portion 131 by four strain elements (not illustrated) provided in a Flexible Printed Circuits (FPC) 134 (see FIG. 7) and outputs a distortion detection signal representing the distortion as a pressure detection signal indicating that pressure has been applied by the user's hand.

<Configuration of Pressure Detector 130>

Figure 7:
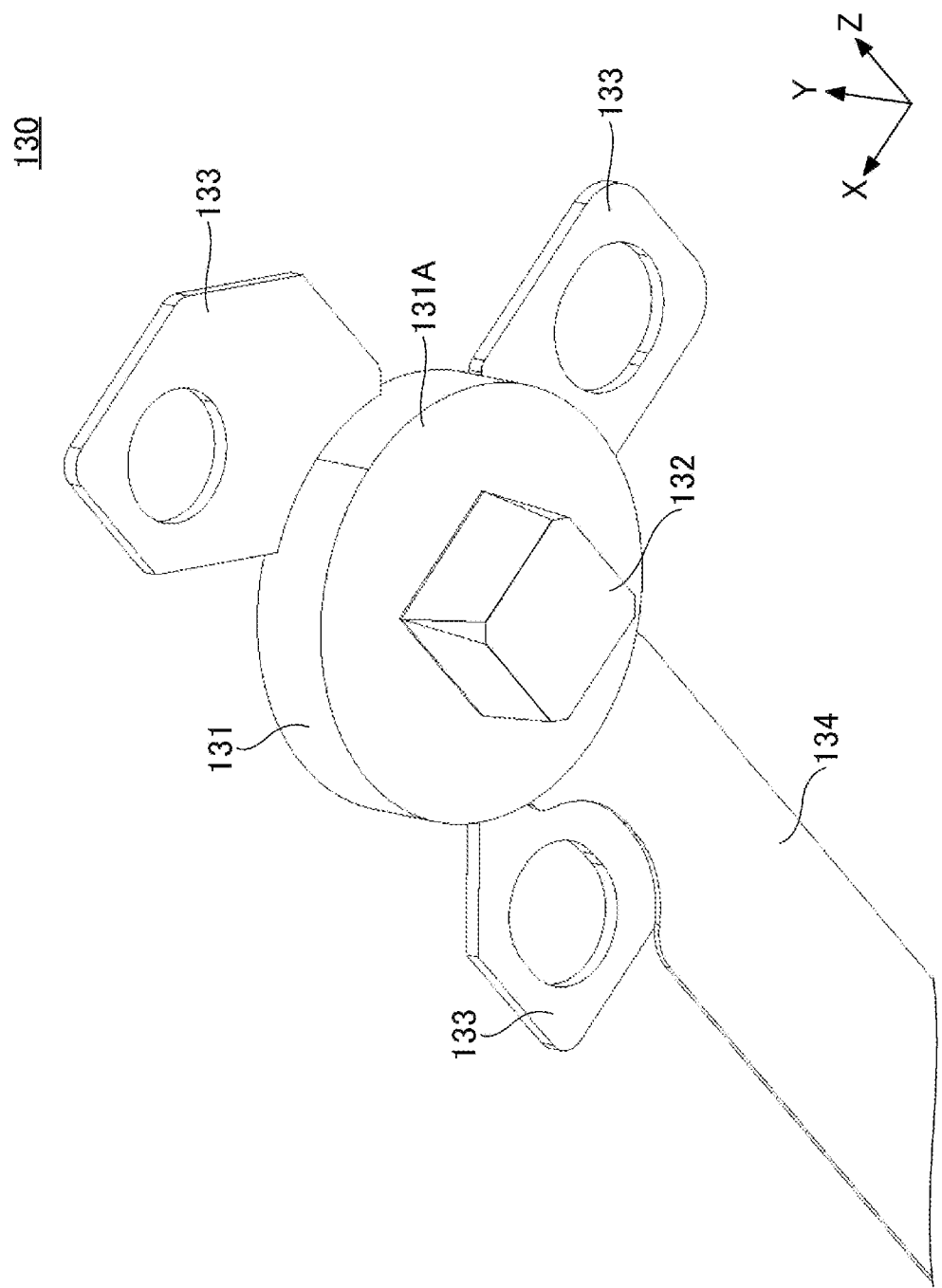
FIG. 7 is an external perspective view of a pressure detector according to the embodiment.

FIG. 7 is an external perspective view of a pressure detector 130 according to the embodiment. In FIG. 7, the pressure detector 130 installed on the door handle 100 as illustrated in FIG. 4 to FIG. 6 is illustrated from the inside of the vehicle (the negative Y-axis side).

As illustrated in FIG. 7, the pressure detector 130 includes the base portion 131, the pillar portion 132, a fixing portion 133, and the FPC 134.

The base portion 131 is a plate-shaped portion having a circular shape in planar view and is formed of a synthetic resin or ceramic. The base portion 131 is a part that is distorted due to pressure applied from the inner case 110 through the pillar portion 132.

The pillar portion 132 is a square-pillar-shaped portion integrally formed with the base portion 131 and protruding from the center of one surface 131A. As illustrated in FIG. 4 to FIG. 6, when the pressure detector 130 is provided such that one surface 131A of the base portion 131 faces the inner side of the vehicle (the negative Y-axis side), the pillar portion 132 protrudes from the center of the surface 131A toward the inner side of the vehicle (the negative Y-axis side).

The fixing portion 133 is a member made of a flat metal or the like and protrudes outwardly from the outer peripheral edge of the base portion 131 in planar view. The fixing portion 133 is a portion fixed to the second flat plate portion 116B.

The FPC 134 is a flexible wired substrate. One side of the FPC 134 is laminated on the other surface of the base portion 131 and fixed to the base portion 131 by an adhesive or the like. The other side of the FPC 134 is connected to the outside. At one side of the FPC 134, four strain elements (not illustrated) are provided in four different directions (for example, 90 degree intervals). The four strain elements detect distortion that occurs in the base portion 131 when a load is applied to the pillar portion 132, and output a distortion detection signal representing the detected distortion to the outside via the FPC 134 as a pressure detection signal indicating that pressure has been applied to the door handle 100. In the present embodiment, the four strain elements are provided, however, the distortion of the base portion 131 may be detected by two strain elements corresponding to the longitudinal direction or by a single strain element.

<Configuration of Control System 10>

Figure 8:
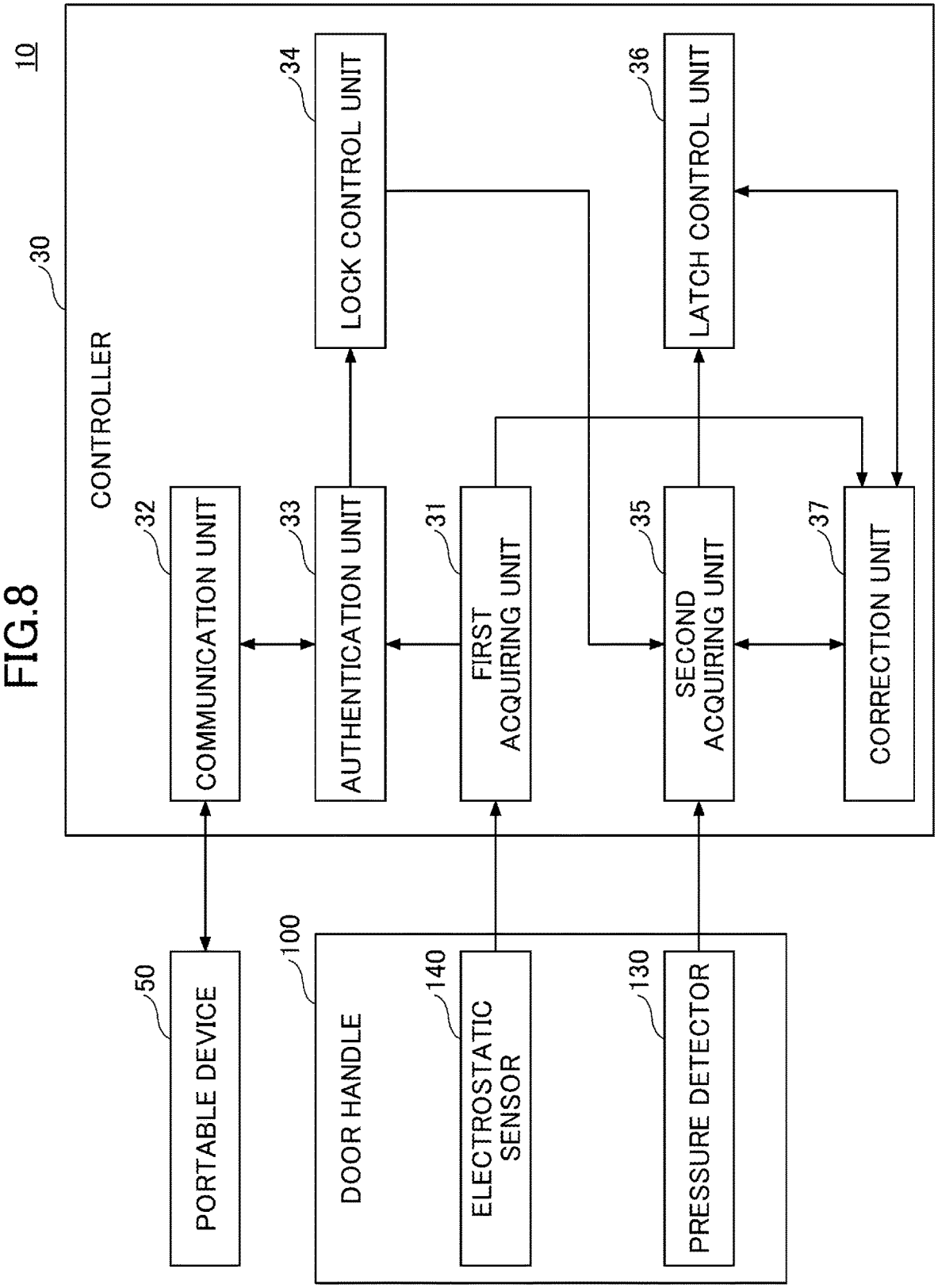
FIG. 8 is a diagram illustrating a configuration of a control system according to the embodiment.

FIG. 8 is a diagram illustrating a configuration of a control system 10 according to the embodiment. As illustrated in FIG. 8, the control system 10 includes the door handle 100, a controller 30, and a portable device 50 as described with reference to FIG. 1 to FIG. 7. The controller 30 includes a first acquiring unit 31, a communication unit 32, an authentication unit 33, a lock control unit 34, a second acquiring unit 35, a latch control unit 36, and a correction unit 37.

When the door 20 is opened, the first acquiring unit 31 acquires a contact detection signal (a current value corresponding to the capacitance of the electrostatic sensor 140) indicating that the user's hand is in contact with the door handle 100 by the electrostatic sensor 140 included in the door handle 100.

The communication unit 32 performs wireless communication with the portable device 50 carried by the user. For example, the communication unit 32 may transmit a request signal to the portable device 50 by Low Frequency (LF) communication with the portable device 50. For example, the communication unit 32 may receive an answer signal transmitted from the portable device 50 by Radio Frequency (RF) communication with the portable device 50.

When the contact detection signal is acquired by the first acquiring unit 31 (i.e., when the contact of the user's hand with the door handle 100 is detected), the authentication unit 33 performs authentication processing of the portable device 50 through radio communication with the portable device 50 by the communication unit 32. For example, the authentication unit 33 transmits a request signal to the portable device 50 via the communication unit 32 and receives an answer signal transmitted from the portable device 50 via the communication unit 32 accordingly. The authentication unit 33 authenticates the portable device 50 by an authentication ID included in the received answer signal.

The lock control unit 34 controls unlocking and locking of the door 20 of the vehicle. For example, the lock control unit 34 opens the lock on the door 20 of the vehicle when the authentication unit 33 successfully authenticates the portable device 50.

For example, the lock control unit 34 locks the door 20 of the vehicle if the pressure detection signal is not acquired by the second acquiring unit 35 within a predetermined time after the lock of the door 20 of the vehicle is unlocked.

For example, the lock control unit 34 transmits a control signal to the control unit (not illustrated) that controls the locking mechanism (for example, a motor) of the door 20 of the vehicle to cause the control unit to control the unlocking operation and the locking operation of the locking mechanism. However, the present invention is not limited thereto. The lock control unit 34 may control the unlocking operation and the locking operation of the lock mechanism by transmitting a control signal to the lock mechanism of the door 20.

The second acquiring unit 35 acquires a pressure detection signal (a voltage value corresponding to the distortion of the base portion 131) indicating that pressure has been applied to the door handle 100 by the user's hand from the pressure detector 130 included in the door handle 100.

The latch control unit 36 controls the release of a latch of the door 20 of the vehicle. For example, the latch control unit 36 releases the latch of the door 20 of the vehicle if the pressure detection signal is acquired by the second acquiring unit 35 35 within a predetermined time after the lock control unit 34 unlocks the door 20 of the vehicle.

For example, the latch control unit 36 transmits a control signal to the control unit (not illustrated) that controls the latch mechanism (for example, a motor) of the door 20 of the vehicle to cause the control unit to control the latch release of the door 20. However, the latch control unit 36 may directly control the operation of the latch mechanism of the door 20 of the vehicle by transmitting a control signal to the latch mechanism of the door 20.

The correction unit 37 corrects the pressure detection signal (a pressure detection value detected by the pressure detector 130) acquired by the second acquiring unit 35 or a threshold value of the pressure detection value used by the latch control unit 36 to determine that the latch is released, according to the user's hand contact position with respect to the door handle 100 detected by the electrostatic sensor 140. The details of the correction unit 37 will be described below with reference to FIG. 10.

The controller 30 is configured with, for example, a Central Processing Unit (CPU), a Read Only Memory (ROM), a Random Access Memory (RAM), communication Interface (I/F), or the like. For example, the controller 30 may implement each of the functions illustrated in FIG. 8 by causing the CPU to execute a program stored in the ROM. For example, a microcomputer may be used as the controller 30.

<Processing Procedure by Controller 30>

Figure 9:
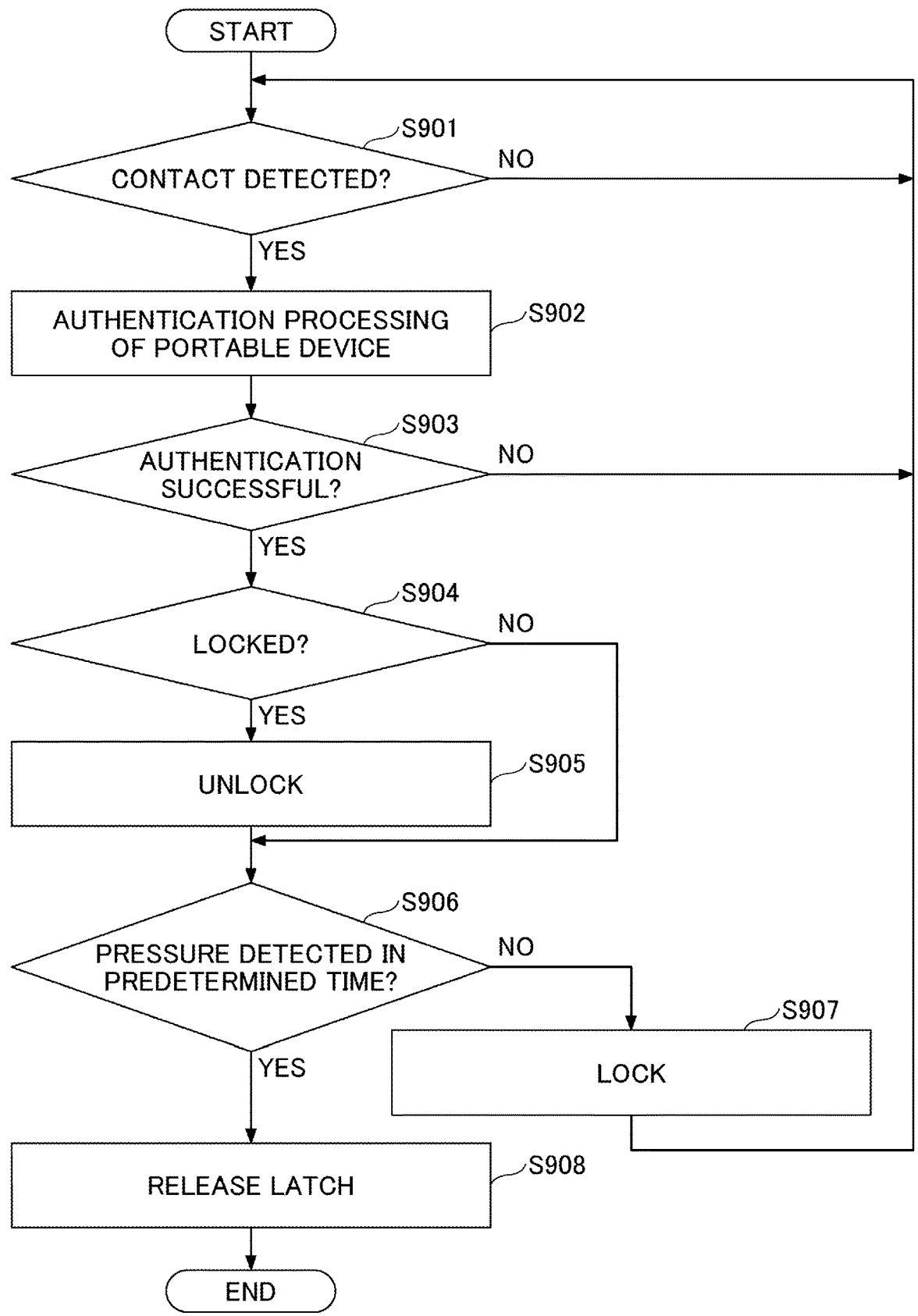
FIG. 9 is a flowchart illustrating a processing procedure by a controller according to the embodiment.

FIG. 9 is a flowchart illustrating a processing procedure by a controller 30 according to the embodiment. The flowchart illustrates the operation when a user opens the door 20 to enter the vehicle.

First, the first acquiring unit 31 determines whether a contact detection signal has been acquired from the electrostatic sensor 140 (i.e., whether a user's hand has contacted the inner case 110 of the door handle 100) (step S901).

In step S901, if the first acquiring unit 31 determines that the contact detection signal has not been acquired (NO in step S901), the controller 30 returns the processing to step S901.

Conversely, in step S901, if the first acquiring unit 31 determines that the contact detection signal has been acquired (YES in step S901), the authentication unit 33 performs authentication processing of the portable device 50 through radio communication with the portable device 50 by the communication unit 32 (step S902).

Then, the authentication unit 33 determines whether the authentication of the portable device 50 was successful through the authentication processing of step S902 (step S903).

In step S903, if the authentication unit 33 determines that the authentication of the portable device 50 has failed (NO is step S903), the controller 30 returns the processing to step S901.

Conversely, in step S903, if the authentication unit 33 determines that the authentication of the portable device 50 has been successful (YES in step S903), the lock control unit 34 determines whether the door 20 of the vehicle is locked based on the output of the detection switch (not illustrated) (step S904).

In step S904, if the lock control unit 34 determines that that the vehicle door 20 is locked (YES in step S904), the lock control unit 34 opens the lock of the door 20 of the vehicle (step S905). Then, the controller 30 proceeds with the process to step S906.

Conversely, in step S904, if the lock control unit 34 determines that the door 20 of the vehicle is not locked (NO in step S904), the controller 30 proceeds to process to step S906.

In step S906, the second acquiring unit 35 determines whether the pressure detection signal has been acquired from the pressure detector 130 (i.e., whether the pressure has been applied to the door handle 100 from the user's hand) within a predetermined time.

In step S906, if the second acquiring unit 35 determines that the pressure detection signal has not been acquired within the predetermined time (NO in step S906), the lock control unit 34 locks the door 20 of the vehicle (step S907). Then, the controller 30 returns the processing to step S901.

Conversely, if the second acquiring unit 35 determines that the pressure detection signal has been acquired within a predetermined time in step S906 (YES in step S906), the latch control unit 36 releases the latch of the door 20 of the vehicle (step S908). This allows the user to open the door 20 to enter the vehicle. Then, the controller 30 ends the process illustrated in FIG. 9.

<Configuration Example of Electrostatic Sensor 140>

FIG. 10 is a plan view illustrating a configuration example of the electrostatic sensor 140 included in the door handle 100 according to the embodiment. As illustrated in FIG. 10, a pair of detection electrodes 142 and 144 are arranged point-symmetrically with respect to the center of the electrostatic sensor 140, so that the electrostatic sensor 140 has a rectangular shape whose longitudinal direction is the front-rear direction (the X-axis direction).

The first detection electrode 142 has a substantially right triangle shape in which the vertical direction (the Z-axis direction) is widest at the front end and the vertical direction (the Z-axis direction) is gradually narrowed toward the rear end.

The second detection electrode 144 has a substantially right triangle shape in which the vertical direction (the Z-axis direction) is widest at the rear end and the vertical direction (the Z-axis direction) is gradually narrowed toward the front end.

The first capacitance value detected by the first detection electrode 142 decreases as the user's hand contact position moves from the front end toward the rear end. On the other hand, the second capacitance value detected by the second detection electrode 144 increases as the user's hand contact position moves from the front end toward the rear end.

Accordingly, the electrostatic sensor 140 can detect the user's hand contact position in the longitudinal direction (the X-axis direction) of the door handle 100, for example, based on the ratio of the first capacitance value detected by the first detection electrode 142 to the second capacitance value detected by the second detection electrode 144.

For example, in the example illustrated in FIG. 10, if a position P1 overlapping the center of the electrostatic sensor 140 in the door handle 100 is the user's hand contact position, the electrostatic sensor 140 can detect that the position P1 as the user's hand contact position by noting a ratio of the first capacitance value and a ratio of the second capacitance value approximately equal to each other.

For example, if a position P2 on the more front side (the positive X-axis side) from the center of the electrostatic sensor 140 in the door handle 100 is the user's hand contact position, the electrostatic sensor 140 can detect the position P2 as the user's hand contact position by noting that the ratio of the first capacitance value and the ratio of the second capacitance value is a ratio corresponding to the ratio of the area of the first detection electrode 142 and the second detection electrode 144 at the position P2 (note that the ratio of the first capacitance value is greater than the ratio of the second capacitance value).

Further, for example, if a position P3 on the more rear side (the positive X-axis side) from the center of the electrostatic sensor 140 in the door handle 100 is the user's hand contact position, the electrostatic sensor 140 can detect the position P3 as the user's hand contact position by noting that the ratio of the first capacitance value and the ratio of the second capacitance value is a ratio corresponding to the ratio of the area of the first detection electrode 142 and the second detection electrode 144 at the position P3 (note that the ratio of the first capacitance value is smaller than the ratio of the second capacitance value). By using the ratio, the position of the hand can be detected even when the distance between the hand and the sensor (the Y-axis direction) is changed.

<Correction Function of Pressure Detection Values or the like>

The controller 30 may further include a correction unit 37 configured to correct the pressure detection value detected by the pressure detector 130 or the threshold value of the pressure detection value used by the latch control unit 36 to determine that the latch is released, according to the user's hand contact position with respect to the door handle 100 detected by the electrostatic sensor 140.

For example, the closer the position at which the operating pressure is applied in the door handle 100 (hereinafter referred to as the "operating position") is from the pressure detector 130, the greater the pressure detection value detected by the pressure detector 130. Therefore, as the operating position in the door handle 100 is closer to the pressure detector 130, the correction unit 37 corrects the pressure detected by the pressure detector 130 to a lower value or corrects the threshold value used by the latch control unit 36 to a higher value.

On the other hand, the farther the operating position in the door handle 100 is from the pressure detector 130, the smaller the pressure detection value detected by the pressure detector 130. Therefore, as the operating position in the door handle 100 is farther to the pressure detector 130, the correction unit 37 corrects the pressure detected by the pressure detector 130 to a higher value or corrects the threshold used by the latch control unit 36 to a lower value.

This enables the controller 30 to release the latch of the door 20 when a constant operating pressure is applied to the door handle 100 regardless of the operating position in the door handle 100. That is, the controller 30 can reduce variations in the user's sense of operation with respect to the door handle 100.

As described above, the pressure detection value is corrected to the lower value as closer to the pressure detector 130, and the pressure detection value is corrected to the higher value as farther away from the pressure detector 130. This is based on the results of actual simulations by the inventors, and is considered to be due to the following reasons.

Specifically, since the end portion of the holding section 111 is regarded as a rigid body, when a load is applied to the pressure detector 130, the end portion of the holding section 111 is displaced on a circular arc whose radius is a line connecting the tilt center of the first inner wall surface 114A (approximately, a portion connected to the thin portion 112B) and the point to which the load is applied.

Accordingly, the applied load closer to the pressure detector 130 has a smaller radius than the applied load farther from the pressure detector 130. Further, in the present embodiment, when the same load is applied, the amount of displacement in the Y-axis direction at any position is considered to be approximately equivalent.

Therefore, when a load is applied to the close side to the pressure detector 130, the inclination of the first inner wall surface 114A becomes larger than when a load is applied to the far side from the pressure detector 130. Accordingly, the pressure detection value detected by the pressure detector 130 is considered to become larger.

Because an appropriate correction value of the pressure detection value according to the position where the operating pressure is applied is affected by the shape of the inner case 110, the appropriate correction value is preferably determined based on the actual measured value or determined by a simulation.

FIRST MODIFICATION

Figure 11:
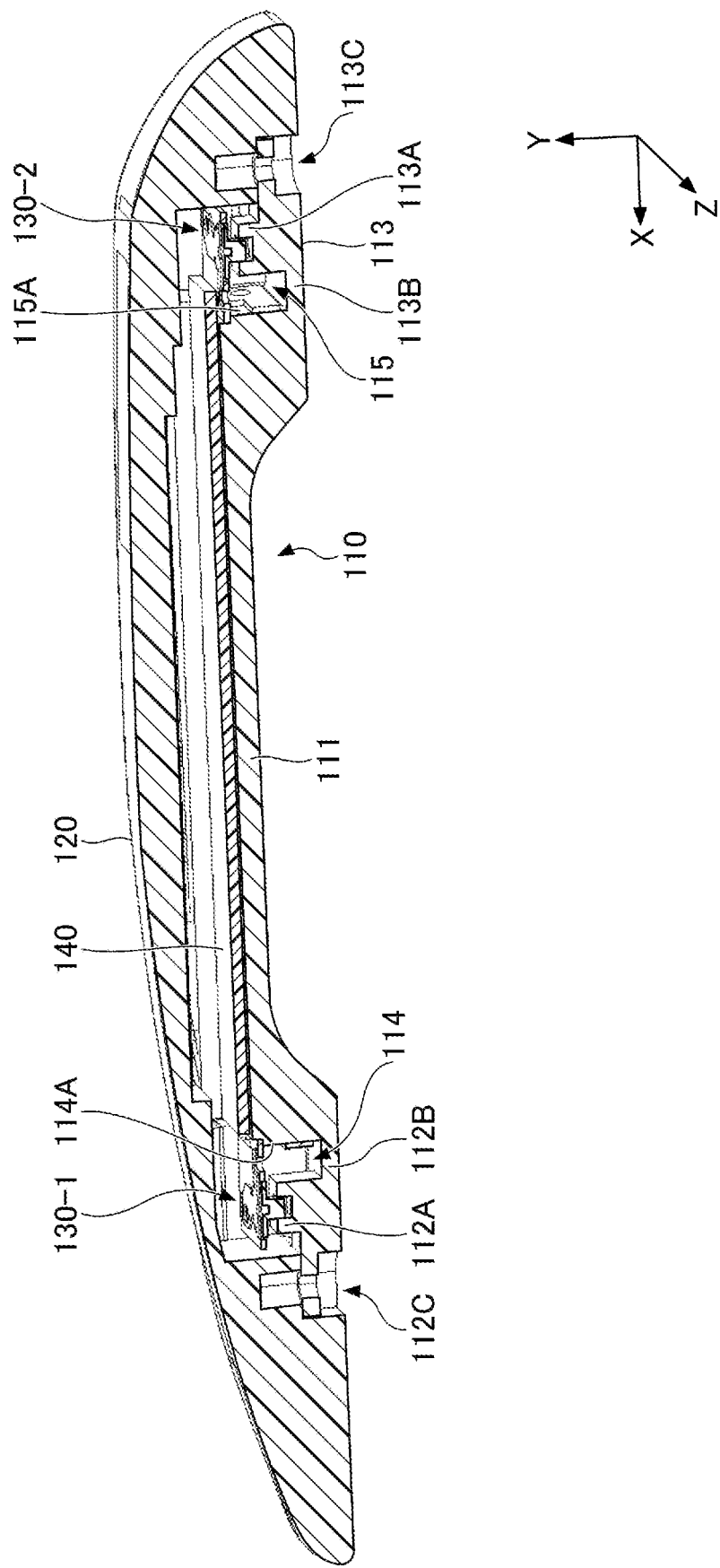
FIG. 11 is a cross-sectional view illustrating a first modification of the door handle according to the embodiment.

FIG. 11 is a cross-sectional view illustrating a first modification of the door handle 100 according to the embodiment, and illustrates a cross-section view of the XY plane viewed from an approximately oblique angle in the positive X-axis direction and in the positive Y-axis direction. In a door handle 100-1 of the first modification illustrated in FIG. 11, a second pressure detector 130-2 is also provided in a recess 115 provided at the rear end of the inner case 110, similar to a first pressure detector 130-1 is provided in a recess 114 provided at the front end of the inner case 110. Both the first pressure detector 130-1 and the second pressure detector 130-2 have the same configuration as the pressure detector 130 described with reference to FIG. 7.

Accordingly, the door handle 100-1 according to the first modification can detect, when pressure is applied to a holding section 111 of the inner case 110, displacement of a first inner wall surface 114A on the holding section 111 side in the recess 114 provided at the front end side of the inner case 110 and displacement of a first inner wall surface 115A on the holding section 111 side in the recess 115 provided at the rear end side of the inner case 110 by a pair of pressure detectors 130-1 and 130-2.

Using the door handle 100-1 of the first modification, for example, the controller 30 may control the release of a latch of the door 20 of the vehicle based on one or both of the pressure detection signal detected by the first pressure detector 130-1 and the pressure detection signal detected by the second pressure detector 130-2.

For example, in the door handle 100-1 according to the first modification, the ratio of the displacement amount of the first inner wall surface 114A of the recess 114 to the displacement amount of the first inner wall surface 115A of the recess 115 varies according to the position where the operating pressure is applied in the longitudinal direction of the inner case 110.

Therefore, for example, the controller 30 may determine the position at which the operating pressure is applied in the longitudinal direction (the X-axis direction) of the inner case 110 based on the ratio of the displacement amount of the first inner wall surface 114A indicated by the pressure detection signal detected by the first pressure detector 130-1 to the displacement amount of the first inner wall surface 115A indicated by the pressure detection signal detected by the second pressure detector 130-2.

Accordingly, the controller 30 can determine the position where the operating pressure is applied in the longitudinal direction (the X-axis direction) of the inner case 110 without using the electrostatic sensor 140, so that correction of such as a pressure detection value described above can be performed.

SECOND MODIFICATION

Figure 12:
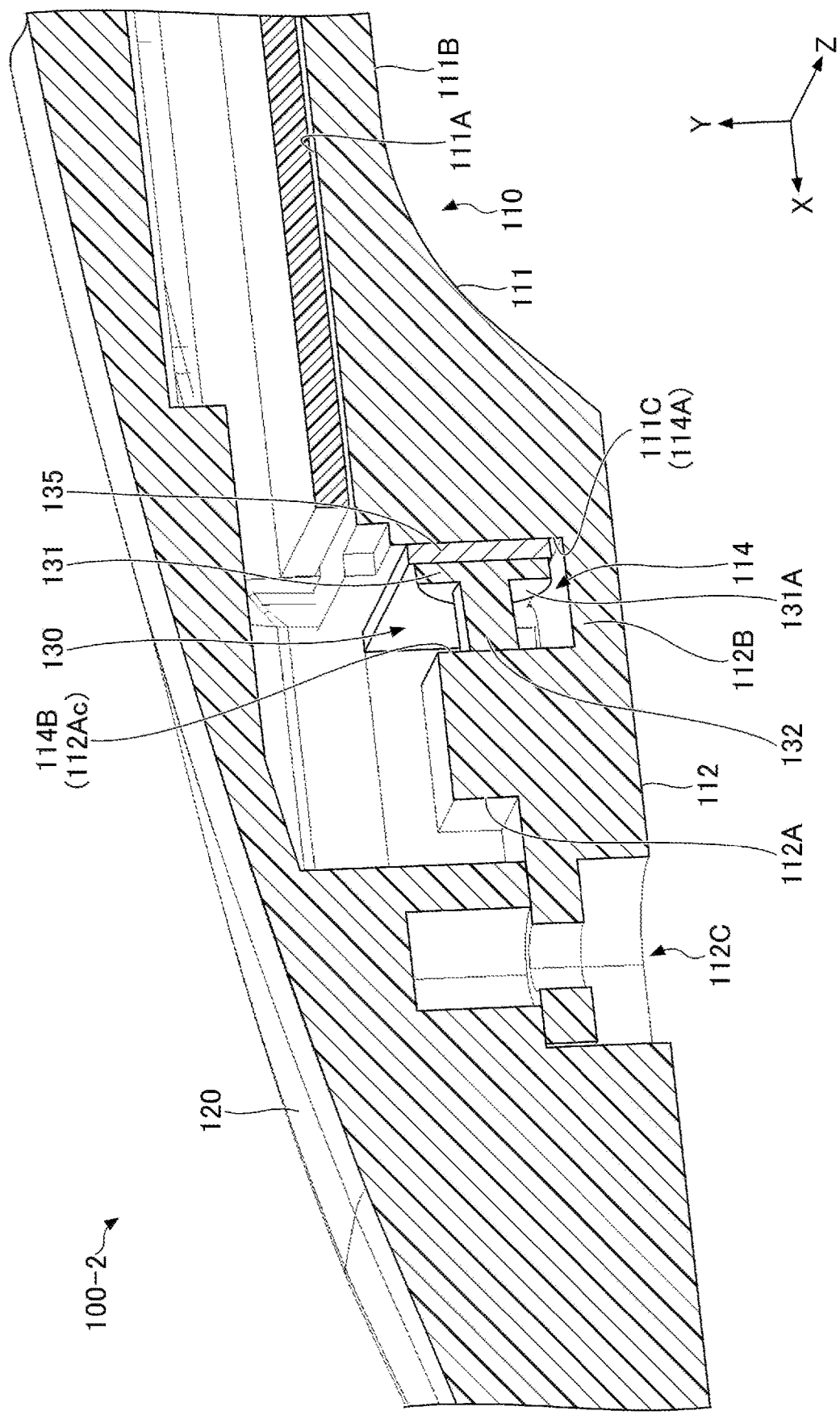
FIG. 12 is a partially enlarged view illustrating a second modification of the door handle according to the embodiment.

FIG. 12 is a partially enlarged view illustrating a second modification of the door handle 100 according to the embodiment. In a door handle 100-2 of the second modification illustrated in FIG. 12, a pressure detector 130 is provided in a recess 114 of an inner case 110.

As illustrated in FIG. 12, the pressure detector 130 of the second modification is installed in the recess 114 such that one surface 131A of a base portion 131 faces the front side (the positive X-axis side). Accordingly, in the pressure detector 130 of the second modification, a pillar portion 132 protrudes from the center of one surface 131A of the base portion 131 toward the front side (the positive X-axis side).

With regard to the pressure detector 130 of the second modification, the tip of the pillar portion 132 is in contact with a second inner wall surface 114B (i.e., a side surface 112Ac on the side of the recess 114 in the pedestal portion 112A) on the front end side of the inner case 110 in the recess 114.

The pressure detector 130 of the second modification includes a flat plate-shaped fixing section 135 provided on the other surface of the base portion 131. The pressure detector 130 of the second modification is fixed to the first inner wall surface 114A (i.e., a front end surface 111C of the holding section 111) on the side of the holding section 111 in the recess 114 provided at the fixing section 135. Accordingly, a fixing member 116 may be omitted.

In the door handle 100-2 of the second modification, when pressure is applied to the outer side of the vehicle (the positive Y-axis side) by the user's hand with respect to the holding section 111 of the inner case 110, a thin portion 112B, which is a part constituting the bottom surface of the recess 114, is locally elastically deformed, so that the first inner wall surface 114A of the recess 114 tilts forward (the positive X-axis direction). This enables the pressure detector 130 fixed to the first inner wall surface 114A to tilt forward (the positive X-axis direction) in the recess 114.

As illustrated in FIG. 12, since the tip of the pillar portion 132 of the pressure detector 130 is in contact with the second inner wall surface 114B of the recess 114, a load is applied to the pillar portion 132 from the second inner wall surface 114B due to the tilting of the pressure detector 130, and as a result, distortion occurs in the base portion 131.

The pressure detector 130 of the second modification detects the distortion of the base portion 131 by four strain elements (not illustrated) provided in the FPC 134 (see FIG. 7) and outputs a distortion detection signal representing the distortion as a pressure detection signal indicating that the pressure has been applied by the user's hand.

THIRD MODIFICATION

Figure 13:
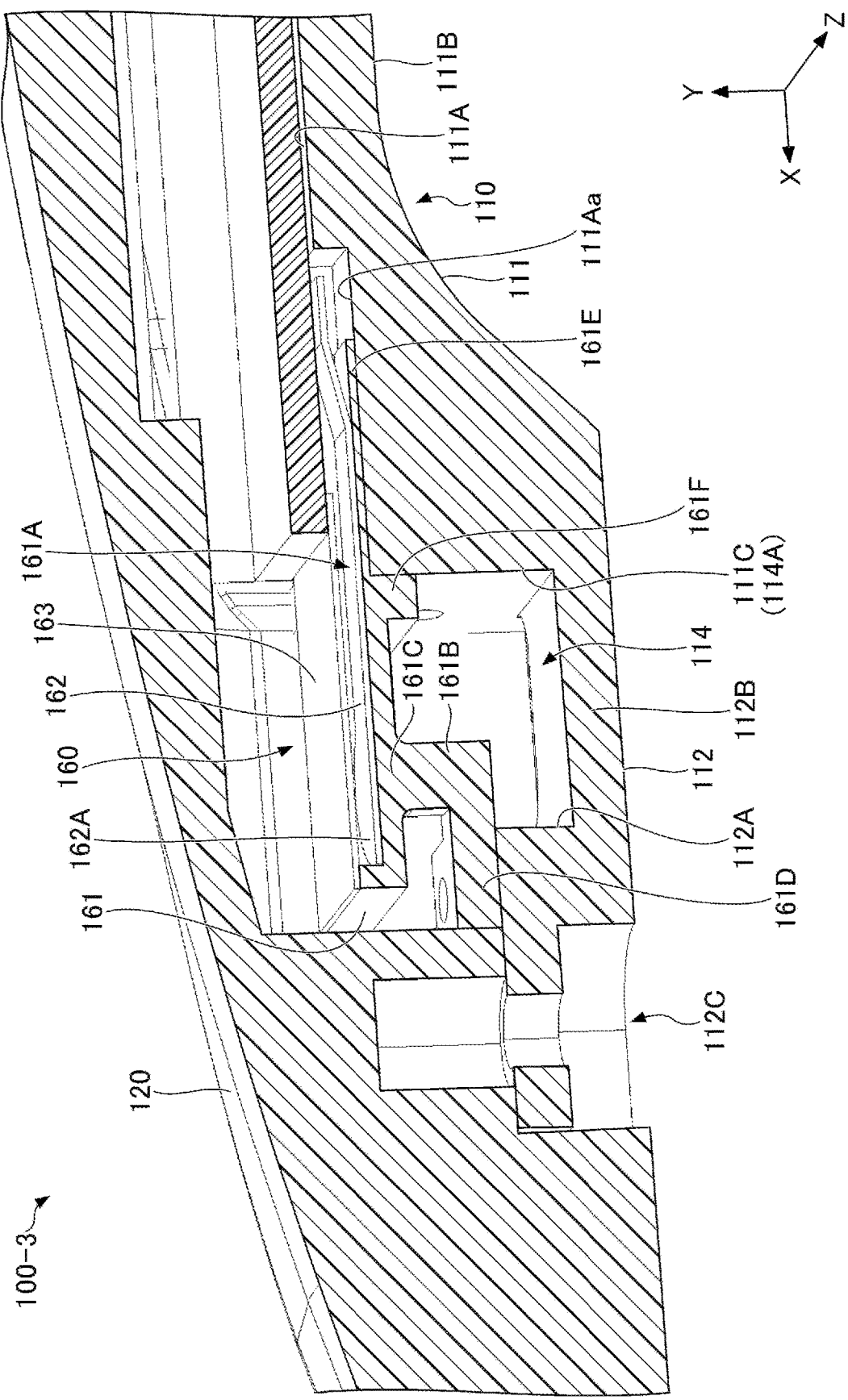
FIG. 13 is a partially enlarged view illustrating a third modification of the door handle according to the embodiment.

FIG. 13 is a partially enlarged view illustrating a third modification of the door handle 100 according to the embodiment. In a door handle 100-3 of the third modification illustrated in FIG. 13, instead of the pressure detector 130, the pressure detection unit 160 having a flat body shape that is substantially horizontal to the XZ plane is installed at a front end portion 111Aa 111Aa (the end portion of positive X-axis side) of a side surface 111A of the holding section 111 as a "pressure detector." The door handle 100-3 of the third modification is configured to detect the displacement of the first inner wall surface 114A of the recess 114 by the pressure detection unit 160.

The pressure detection unit 160 includes a body portion 161. The body portion 161 is a member formed of a resin material, which forms the entire shape of the pressure detection unit 160 (i.e., a flat plate with the X-axis direction as the longitudinal direction). Specifically, the body portion 161 has a longitudinal shape extending forward (the positive X-axis direction) from the front end portion 111Aa of the side surface 111A of the holding section 111 to a position opposite to the pedestal portion 112A such that the body portion 161 covers the outside (the positive Y-axis side) of the recess 114 of the inner case 110.

A recess 161A extends along the X-axis direction on the surface of the body portion 161 on the outer side (the positive Y-axis side) of the vehicle. An FPC 162 is provided in the recess 161A. The FPC 162 corresponds to the FPC 134 of the pressure detector 130 described above.

Further, a lid 163 made of a metal plate is fixed to the surface of the body portion 161 on the outside (the positive Y-axis side) of the vehicle by an adhesive or the like, and a recess 161A is closed by the lid 163. Further, since the lid 163 made of a metal is provided, the strength of the body portion 161 is increased.

In proximity to the surface of the inner side of the body portion 161 (the negative Y-axis) and the front end portion (the end portion of the positive X-axis), a protrusion portion 161B, having a shape of square pillar, protrudes toward the inside of the recess 114 is integrally formed toward the inner side of the vehicle (the negative Y-axis side) so as to face the pedestal portion 112A. The protrusion portion 161B is another example of a "pillar portion" and corresponds to the pillar portion 132 of the pressure detector 130 described above. That is, a peripheral portion 161C of the protrusion portion 161B in the body portion 161 is another example of the "base portion" and corresponds to the base portion 131 of the pressure detector 130 described above, and is fixed to the more center portion (the center position of the length in the X direction) from the recess 114 in the longitudinal direction of the inner case 110.

One end 162A of the FPC 162 is fixed to the base portion 131 by an adhesive or the like on the surface (i.e., a bottom surface of the recess 161A) of the peripheral portion 161C on the outer side of the vehicle (the Y-axis positive side). Four strain elements (not illustrated) are provided at one end 162A in four different directions (for example, 90 degree intervals). The four strain elements may detect distortion of the peripheral portion 161C in the body portion 161.

The protrusion portion 161B includes a fixing section 161D that extends forward (the positive X-axis direction) from the tip of the protrusion portion 161B. The front end (the end portion of the positive X-axis) of the protrusion portion 161B is screwed and fixed with respect to the pedestal portion 112A at the fixing section 161D.

Further, a rear portion 161E of the body portion 161 (a portion of the rear side (the negative X-axis side) of a rib 161F) is screwed and fixed with respect to the front end portion 111Aa while overlapping the front end portion 111Aa of the side surface 111A of the holding section 111.

On the surface of the inside of the body portion 161 (the negative Y-axis) and a position rear side from the protrusion portion 161B, the rib 161F protrudes toward the inside of the recess 114 and is integrally formed toward the inner side of the vehicle (the negative Y-axis side). The rib 161F is in contact with the first inner wall surface 114A such that when the first inner wall surface 114A is tilted forward (the positive X-axis direction), a load (in the X-axis positive direction) can be applied to forward certainly with respect to the body portion 161.

In the door handle 100-3 of the third modification, when pressure is applied to the outside of the vehicle (the positive Y-axis side) by the user's hand with respect to the holding section 111 of the inner case 110, the first inner wall surface 114A of the recess 114 tilts forward (the positive X-axis direction) as in the other embodiments. This enables the front end portion 111Aa of the side surface 111A of the holding section 111 to move forward (the positive X-axis direction). Note that the body portion 161 of the pressure detection unit 160 fixed to the front end portion 111Aa also moves forward (the positive X-axis direction).

At this time, since the tip of the protrusion portion 161B of the body portion 161 is fixed to the pedestal portion 112A, distortion occurs in the peripheral portion 161C of the body portion 161. The pressure detection unit 160 of the third modification detects the distortion of the peripheral portion 161C by the four strain elements provided at one end 162A of the FPC 162 and outputs a distortion detection signal representing the distortion as a pressure detection signal indicating that pressure has been applied by the user's hand.

As described above, the door handle 100 according to an embodiment, to be attached to the door 20, includes the outer case 120, the inner case 110 integrated with the outer case 120, and the pressure detector 130 configured to detect pressure applied to the inner case 110. The inner case 110 includes the recess 114 in proximity to the end portion in the longitudinal direction, and the pressure detector 130 detects a displacement of the first inner wall surface 114A on the center portion side of the inner case 110 in the recess 114 caused by the pressure applied to the inner case 110.

This enables the door handle 100 according to the embodiment to locally displace the first inner wall surface 114A of the recess 114 when pressure is applied to the inner case 110. Accordingly, the door handle 100 according to an embodiment can more reliably detect the pressure applied to the inner case 110 (i.e., inside of the door handle 100) by detecting the local displacement of the first inner wall surface 114A.

Further, in the door handle 100 according to an embodiment, the pressure detector 130 includes a base portion 131 fixed to the first inner wall surface 114A and a pillar portion 132 protruding from the base portion 131. The pressure detector 130 detects a distortion of the base portion 131 caused by a load applied to the pillar portion 132 accompanying the displacement of the first inner wall surface 114A.

This enables the door handle 100 according to the embodiment to focus the pressure applied to the inner case 110 on the pillar portion 132. Further, the door handle 100 according to the embodiment may also amplify the distortion of the base portion 131 by distorting the base portion 131 through the pillar portion 132. Accordingly, the door handle 100 according to the embodiment can detect the pressure applied to the pressure applied to the inner case 110 (i.e., inside of the door handle 100) more reliably by detecting the amount of the amplified distortion.

Further, the controller 30 according to an embodiment, includes a lock control unit 34 that unlocks the door 20 when the electrostatic sensor 140 of the door handle 100 attached to the door 20 detects the contact of the user's hand with a predetermined position inside of the door handle 100. Further, the controller 30, includes the latch control unit 36 that releases the latch of the door 20, in the state where the lock of the door 20 is unlocked, when the pressure detector 130 of the door handle 100 detects the pressure applied to a predetermined position inside of the door handle 100.

By detecting the contact and the pressure with respect to the same position inside of the door handle 100, the controller 30 according to the embodiment can unlock the door 20 and release the latch of the door 20 only by performing a series of operations in which the user holds and pulls the door handle 100 to open the door. Therefore, the door 20 can be opened smoothly without any discomfort. Also, at the time when the lock is unlocked, authentication of the portable device 50 has been completed. Subsequently, the latch is released upon detecting the pressure so that the latch can be immediately released without authentication along with the pulling operation.

EXAMPLE OF CORRECTION PROCEDURE

Figure 14:
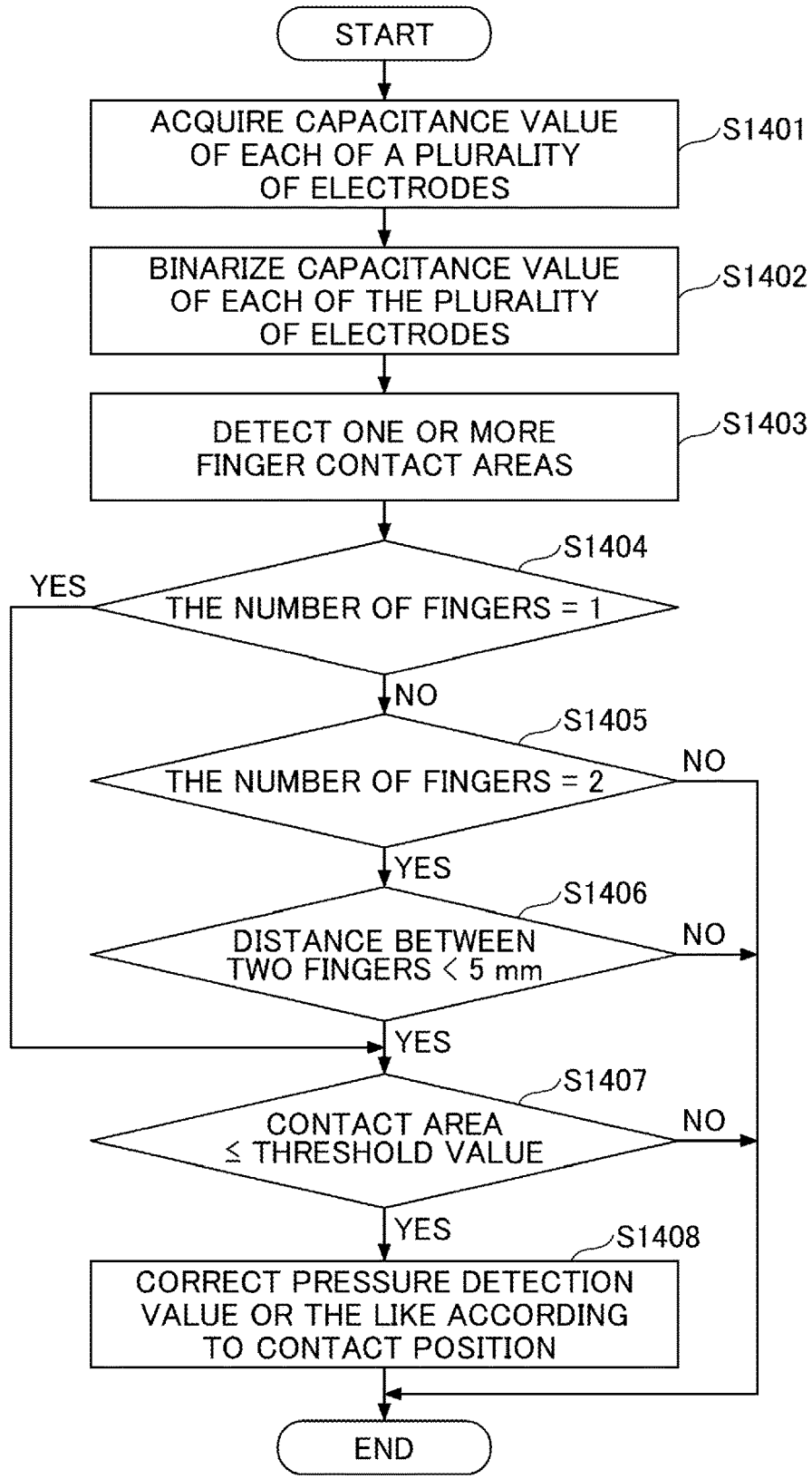
FIG. 14 is a flowchart illustrating an example of a correction processing procedure by the controller (correction unit) according to the embodiment.

FIG. 14 is a flowchart illustrating an example of a correction processing procedure by the controller 30 (the correction unit 37) according to the embodiment. The correction unit 37 has already described that the pressure detection value or the like (the pressure detection value or the threshold value) may be corrected according to the pressure detection position. However, the present invention is not limited thereto, the correction unit 37 may determine whether a correction, such as a pressure detection value, is performed according to the number of fingers, the distance between fingers, and the contact area in the contact operation to the door handle 100 as described below.

As a premise for the present process, the electrostatic sensor 140 uses a touch sensor having a sufficiently fine resolution compared to the width of a finger. Specifically, in the electrostatic sensor 140, a plurality of electrodes are arranged side by side so that each contact position of at least a plurality of fingers can be individually detected, and each electrode is driven individually and an output is obtained individually.

First, the correction unit 37 acquires the capacitance value of each of the plurality of electrodes included in the electrostatic sensor 140 (step S1401).

Next, the correction unit 37 binarizes the capacitance value of each of the plurality of electrodes acquired in step S1401 (step S1402). For example, the correction unit 37 converts the capacitance value equal to or higher than a predetermined threshold value to "1," which means that a contact has been made, and converts the capacitance value less than the predetermined threshold value to "0," which means that no contact has been made.

Next, the correction unit 37 detects one or more finger contact areas based on the capacitance value of each of the plurality of electrodes binarized in step S1402 (step S1403). For example, the correction unit 37 detects an area consisting of a set of electrodes having an electrostatic capacitance value of "1" in the electrostatic sensor 140 as a candidate area. Then, the correction unit 37 detects, as a finger contact area, a candidate area having a predetermined size corresponding to one finger among one or more of the detected candidate areas.

Next, the correction unit 37 determines whether the number of fingers that performed the contact operation to the door handle 100 is "1" based on the number of fingers contact areas detected in step S1403 (step S1404).

In step S1404, when the number of fingers that performed the contact operation to the door handle 100 is determined to be "1" (YES in step S1404), the correction unit 37 proceeds to the process to step S1407.

On the other hand, in step S1404, when the number of fingers that performed the contact operation to the door handle 100 is determined not to be "1" (NO in step S1404), the correction unit 37 determines whether the number of fingers that performed the contact operation to the door handle 100 is "2" based on the number of the finger contact areas detected in step S1403 (step S1405).

In step S1405, when the number of fingers that performed the contact operation to the door handle 100 is determined not to be "2" (NO in step S1405), the correction unit 37 ends the process illustrated in FIG. 14.

On the other hand, in step S1405, when the number of fingers that performed the contact operation to the door handle 100 is determined to be "2" (YES in step S1405), the correction unit 37 determines whether the distance between the two fingers that performed the contact operation to the door handle 100 is equal to or less than "5 mm" (step S1406).

In step S1406, when it is determined that the finger distance between the two fingers that performed the contact operation to the door handle 100 is not equal to or less than "5 mm" (NO in step S1406), the correction unit 37 ends the process illustrated in FIG. 14.

On the other hand, in step S1406, when it is determined that the finger distance between the two fingers that performed the contact operation to the door handle 100 is equal to or less than "5 mm" (YES in step S1406), the correction unit 37 proceeds to process to step S1407.

In step S1407, the correction unit 37 determines whether the contact area of the finger where the contact operation to the door handle 100 is performed is equal to or less than a predetermined threshold value based on the area of the finger contact area detected in step S1403.

In step S1407, when it is determined that the contact area is not equal to or less than the predetermined threshold value (No in step S1407), the correction unit 37 ends the process illustrated in FIG. 14.

On the other hand, in step S1407, when it is determined that the total contact area is equal to or less than the predetermined threshold value (YES in step S1407), the correction unit 37 performs correction of the pressure detection value or the like according to the position of the finger contact area (i.e., the contact position of the user's fingers) detected in step S1403 (step S1408). Then, the correction unit 37 ends the process illustrated in FIG. 14.

Through the process illustrated in FIG. 14, if the contact operation to the door handle 100 is performed by one finger or if the contact operation to the door handle 100 is performed by two fingers proximate to each other, the correction unit 37 corrects the pressure detection value or the like. This enables the correction unit 37 to perform correction such as the pressure detection value when the contact position of the user's fingers and the position to which the load is applied by the user's fingers are substantially same. Therefore, the correction unit 37 can appropriately perform correction such as the pressure detection value according to the contact position of the user's fingers. Accordingly, the variation in the user's sense of operation at the time of performing the contact operation to the door handle 100 can be reduced.

Conversely, when the contact operation to the door handle 100 is performed by two fingers that are not in proximity to each other, when the contact operation to the door handle 100 is performed by three or more fingers, or when the contact operation to the door handle 100 is performed at a relatively large contact area, the correction unit 37 does not correct the pressure detection value. This enables the correction unit 37 to prevent correction of the pressure detection value or the like, when the position where the load is applied by the user's fingers is not clear. Accordingly, an improper correction of the pressure detection value or the like can be prevented.

FIRST EXAMPLE OF CONTACT OPERATION

Figure 15:
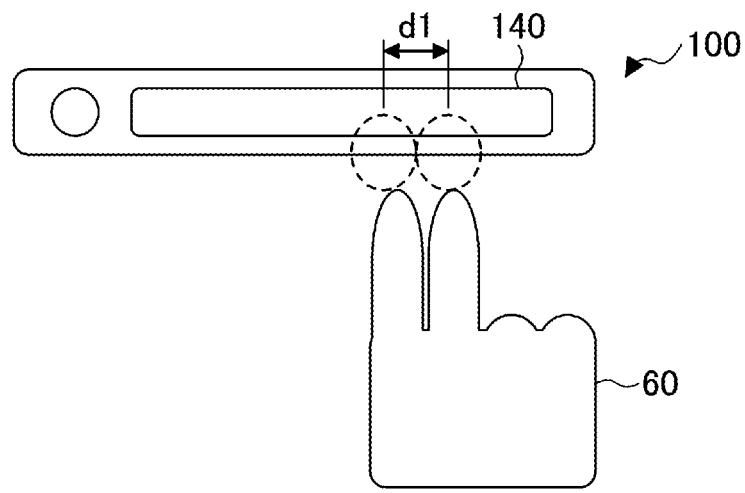
FIG. 15 is a diagram schematically illustrating a first example of a contact operation to the door handle by a user.

FIG. 15 is a diagram schematically illustrating a first example of the contact operation to the door handle 100 by a user. In the first example illustrated in FIG. 15, the contact operation to the door handle 100 by the two fingers of the user's hand 60 is represented. Note that, in the first example illustrated in FIG. 15, a distance dl of the two fingers are shorter than a predetermined distance of fingers. In this case, the correction unit 37 corrects the pressure detection value according to the contact position with respect to the touch sensor 140 based on the process illustrated in FIG. 14. In the first example illustrated in FIG. 15, the contact positions of the two fingers are substantially identical to the positions where the load is applied by the two fingers. Therefore, the correction unit 37 corrects the pressure detection value according to the contact position (for example, the position of the center of gravity) of the two fingers. Accordingly, the variation in the user's sense of operation at the time of performing the contact operation to the door handle 100 can be reduced.

As illustrated in FIG. 14, even when the contact operation to the door handle 100 by one finger of the user's hand 60 is performed, the correction unit 37 corrects the pressure detection value according to the contact position with respect to the touch sensor 140. In this case, the contact position of one finger and the position where the load is applied by one finger are substantially same. Therefore, the correction unit 37 can reduce the variation in the user's sense of operation at the time of performing the contact operation to the door handle 100 by correcting the pressure detection value or the like according to the contact position of one finger.

SECOND EXAMPLE OF CONTACT OPERATION

Figure 16:
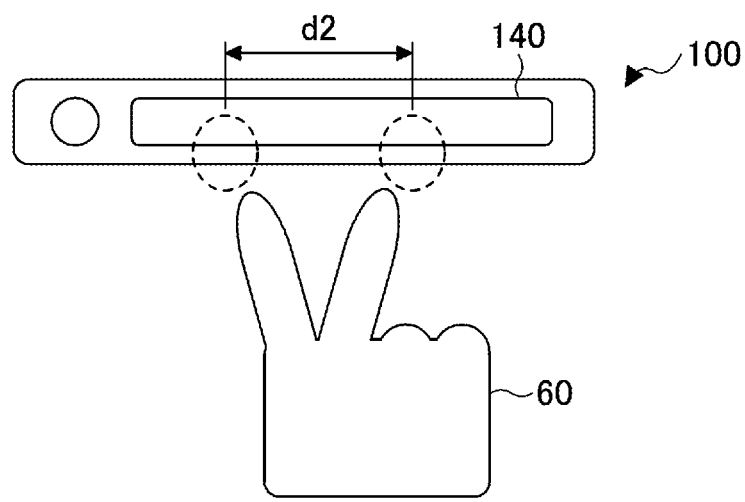
FIG. 16 is a diagram schematically illustrating a second example of the contact operation to the door handle by the user.

FIG. 16 is a diagram schematically illustrating a second example of the contact operation to the door handle 100 by a user. In the second example illustrated in FIG. 16, the contact operation to the door handle 100 by the two fingers of the user's hand 60 is represented. Note that, in the second example illustrated in FIG. 16, a distance d2 of the two fingers are longer than a predetermined distance of fingers. In In this case, the correction unit 37 does not correct the pressure detection value according to the contact position with respect to the touch sensor 140 based on the process illustrated in FIG. 14. In the second example illustrated in FIG. 16, it is unclear which of the two fingers applies the load. Therefore, the correction unit 37 does not correct the pressure detection value according to the contact position of the two fingers. Accordingly, an improper correction of the pressure detection value or the like can be prevented.

THIRD EXAMPLE OF CONTACT OPERATION

Figure 17:
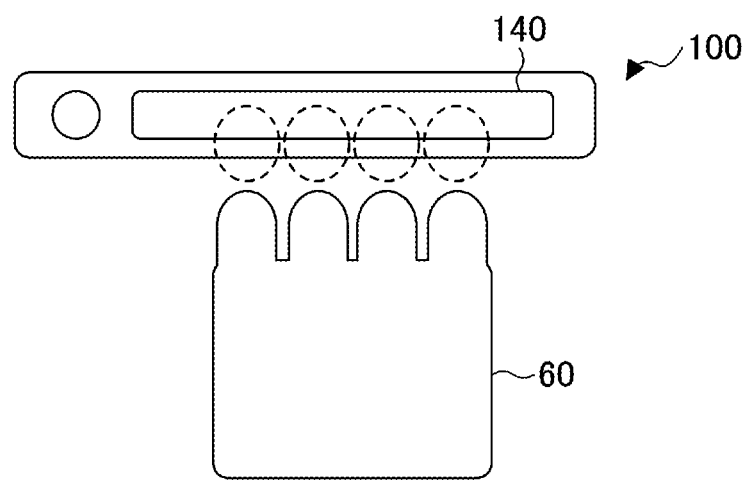
FIG. 17 is a diagram schematically illustrating a third example of the contact operation to the door handle by the user.

FIG. 17 is a diagram schematically illustrating a third example of the contact operation to the door handle 100 by a user. In the third example illustrated in FIG. 17, the contact operation to the door handle 100 by the four fingers of the user's hand 60 is represented. In this case, the correction unit 37 does not correct the pressure detection value according to the contact position with respect to the touch sensor 140 based on the process illustrated in FIG. 14. In the third example illustrated in FIG. 17, it is unclear which of the four fingers applies the load. Therefore, the correction unit 37 does not correct the pressure detection value according to the contact position of the four fingers. Accordingly, an improper correction of the pressure detection value or the like can be prevented.

As illustrated in the flowchart of FIG. 14, the correction unit 37 does not correct the pressure detection value according to the contact position with respect to the touch sensor 140 even when the contact operation is performed with a relatively large contact area by a user's finger.

However, in the case where a plurality of fingers (in the present embodiment, three or more fingers) are used for the contact operation or the contact operation is performed with a relatively large area, a relatively large load can be applied to the door handle 100. Therefore, a variation in the user's sense of operation is unlikely to occur even if the pressure detection value or the like is not corrected.

In the flowchart of FIG. 14, the correction unit 37 may detect a contact operation by a palm of the user's hand 60 in addition to or instead of detecting a finger of the user's hand 60. When the contact operation by the palm of the user's hand 60 is detected, the correction unit 37 may not be required to correct the pressure detection value or the like.

Although specific embodiments have been described above, the present invention is not limited to the above-described embodiments. Variations and modifications may be made to the described subject matter without departing from the scope of the invention as set forth in the accompanying claims.

The pressure detector of the present invention is not limited to the pressure detector 130, and may be in any manner so long as at least the displacement of the first inner wall surface of the recess can be detected. For example, a pressure detector may be used which detects the amount of change in the distance between the first inner wall surface and the second inner wall surface of the recess by a mutual capacitance method using a first detection electrode provided on the first inner wall surface and a second detection electrode provided on the second inner wall surface.

In an embodiment of the present invention, a recess having a thin portion on the inside (the positive Y-axis side) is formed at the end portion of the inner case by opening the outer side (the positive Y-axis side). Then, the pressure is detected by the pressure detector by utilizing the fact that the first inner wall surface is tilted so that the opening of the recess is narrowed when the pressure is applied. However, the present invention is not limited thereto, for example, a recess having a thin portion on the outside (the positive Y-axis side) may be formed at the end portion of the inner case by opening the inside (the negative Y-axis side). Then, the pressure may be detected by the pressure detector by utilizing the fact that the first inner wall surface is tilted so that the opening of the recess is widened when the pressure is applied.

The pressure detector of the present invention is not limited to the use of pressure to release the latch of the door. For example, the pressure detector of the present invention may be used to detect the pressure for unlocking the lock on the door.

Further, the door handle of the present invention is not limited to application to an outer door handle for a vehicle. For example, the door handle of the present invention are also applicable to an inner door handle for a vehicle and other purposes (for example, residential door handles, etc.).

In the present embodiment, the pressure detector 130 detects the load applied to the outside (the positive Y-axis side) of the door handle 100, but also may obtain the pressure value applied in the Z-axis direction and the vector value on the YZ plane to obtain the scalar value. Further, whether the scalar value exceeds the predetermined threshold value may be determined. In this case, for example, when a load is applied from the diagonal direction between the Y axis and the Z axis, and when a load is applied from the Y axis, the latch can be released with the same load.

Further, the releasing of the latch may be controlled from the direction of the vector. For example, when the load is applied from the diagonally downward side, it may be judged that a child has operated the machine, and the latch release may be restricted in consideration of the surrounding environment such as a vehicle stopped position.

What is claimed is:

1. A door handle to be attached to a door, the door handle comprising:
    an outer case;
    an inner case integrated with the outer case; and
    a pressure detector configured to detect pressure applied to the inner case,
    wherein the inner case includes a recess in proximity to an end portion in a longitudinal direction,
    the pressure detector detects a displacement of a first inner wall surface on a horizontal center portion side of the inner case in the recess, caused by the pressure applied to the inner case,
    the pressure detector includes both a base portion directly or indirectly fixed to the first inner wall surface and a pillar portion protruding from the base portion, and detects distortion of the base portion, caused by a load applied to the pillar portion due to the displacement of the first inner wall surface,
    the pressure detector is disposed in the inner case so as to face a holding portion provided closer to the end portion than the recess such that the pillar portion faces the holding portion side,
    the base portion is fixed to the first inner wall surface through a fixing member,
    a tip of the pillar portion is held by the holding portion, and
    the pillar portion causes distortion in the base portion upon application of a load by the holding portion to the pillar portion due to the displacement of the first inner wall surface.

2. The door handle according to claim 1, wherein the pillar portion is disposed inside of the recess so as to face a second inner wall surface facing the first inner wall surface,
    the base portion is fixed to the first inner wall surface, and
    the pillar portion causes distortion in the base portion upon application of a load by the second inner wall surface to the pillar portion due to the displacement of the first inner wall surface.

3. The door handle according to claim 1, wherein the recess is a first recess provided at a first end portion, and a second recess provided at a second end portion in the longitudinal direction, and
    in the door handle, the pressure detector is a first pressure detector provided in the first recess at the first end portion, and a second pressure detector provided in the second recess at the second end portion.

4. The door handle according to claim 1, further comprising a contact detector configured to detect contact of a user's hand with respect to the door handle.

5. A door handle to be attached to a door, the door handle comprising:
    an outer case;
    an inner case integrated with the outer case; and
    a pressure detector configured to detect pressure applied to the inner case,
    wherein the inner case includes a recess in proximity to an end portion in a longitudinal direction,
    the pressure detector detects a displacement of a first inner wall surface on a horizontal center portion side of the inner case in the recess, caused by the pressure applied to the inner case,
    the pressure detector includes both a base portion directly or indirectly fixed to the first inner wall surface and a pillar portion protruding from the base portion, and detects distortion of the base portion, caused by a load applied to the pillar portion due to the displacement of the first inner wall surface,
    the pressure detector is disposed in the inner case so as to face a pedestal portion provided closer to the end portion than the recess such that the pillar portion faces the pedestal portion side,
    the base portion is fixed to the first inner wall surface at the horizontal center portion side relative to the recess in a longitudinal direction of the inner case,
    a tip of the pillar portion is held by the pedestal portion, and
    the pillar portion causes distortion in the base portion by being applied a load from the pedestal portion due to the displacement of the first inner wall surface.

6. The door handle according to claim 5, wherein the recesses are provided at a first end portion and a second end portion in the longitudinal direction, and
    in the door handle, the pressure detector is provided in each of the recess at the first end portion and the recess at the second end portion.

7. The door handle according to claim 5, further comprising a contact detector configured to detect contact of a user's hand with respect to the door handle.

8. A door handle to be attached to a door, the door handle comprising:
    an outer case;
    an inner case integrated with the outer case;
    a pressure detector configured to detect pressure applied to the inner case;
    a contact detector configured to detect a contact position of a user's hand with respect to the inner case; and
    a controller including a memory and a processor coupled to the memory and configured to correct, according to a distance between the pressure detector and the contact position detected by the contact detector:
    the pressure detected by the pressure detector or
    a threshold value of a pressure detection value for determining whether to perform a predetermined operation.

9. The door handle according to claim 8, wherein the processor determines whether to correct the pressure based on an area of the contact of the user's hand with respect to the inner case, thereby not correcting the pressure upon determining that the area of the contact of the user's hand with respect to the inner case is greater than a predetermined threshold value.

10. The door handle according to claim 8, wherein the processor is further configured to:

correct, as the contact position detected by the contact detector is closer to the pressure detector, the pressure detected by the pressure detector lower or the threshold value higher, and correct, as the contact position detected by the contact detector is farther to the pressure detector, the pressure detected by the pressure detector higher or the threshold value lower.

11. A controller comprising:

a memory; and a processor coupled to the memory and configured to unlock a door upon detection of contact, by a contact detector of the door handle according to claim 8 attached to the door, of a user's hand with respect to a predetermined position inside of the door handle; and release a latch of the door, in a state where the door is unlocked, upon detection of pressure, by the pressure detector of the door handle, applied to a predetermined position inside of the door handle.

12. The controller according to claim 11, wherein the inner case includes a recess in proximity to an end portion in a longitudinal direction, wherein the processor, in a state where the door is unlocked, releases the latch of the door when a displacement of an inner wall surface on a horizontal center portion side of the inner case, caused by the pressure applied to the inner case, is detected by the pressure detector.

* * * * *